(12) United States Patent
Liu et al.

(10) Patent No.: US 12,700,973 B2
(45) Date of Patent: Aug. 4, 2026

(54) HYBRID AUTOMATIC REPEAT REQUEST FEEDBACK FOR MULTICAST

(71) Applicant: QUALCOMM Incorporated, San Diego, CA (US)

(72) Inventors: Le Liu, San Jose, CA (US); Alberto Rico Alvarino, San Diego, CA (US); Mostafa Khoshnevisan, San Diego, CA (US); Peter Gaal, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 18/057,936

(22) Filed: Nov. 22, 2022

(65) Prior Publication Data

US 2023/0261843 A1 Aug. 17, 2023

Related U.S. Application Data

(60) Provisional application No. 63/267,841, filed on Feb. 11, 2022.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC .................................................... H04L 5/0055
See application file for complete search history.

(56) References Cited

U.S. PATENT DOCUMENTS

| | | | | |
|---|---|---|---|---|
| 2022/0279454 A1* | 9/2022 | Papasakellariou | .... | H04W 72/23 |
| 2022/0361228 A1* | 11/2022 | Zewail | .................. | H04L 1/1861 |
| 2023/0284227 A1* | 9/2023 | Choi | ..................... | H04L 1/1861 |
| | | | | 370/329 |
| 2024/0275526 A1* | 8/2024 | Elmali | .................. | H04L 1/1893 |
| 2024/0348377 A1* | 10/2024 | Wang | ................... | H04L 1/1861 |
| 2024/0430045 A1* | 12/2024 | Lee | ........................ | H04L 12/189 |

OTHER PUBLICATIONS

International Search Report and Written Opinion—PCT/US2022/080379—ISA/EPO—Mar. 14, 2023.

(Continued)

*Primary Examiner* — Jason E Mattis
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, an uplink grant for a physical uplink shared channel (PUSCH) that is to overlap in time with a physical uplink control channel (PUCCH) used for hybrid automatic repeat request (HARQ) feedback for at least multicast, the uplink grant including a downlink assignment index (UL-DAI) indication that indicates at least one of: whether the HARQ feedback of the PUCCH is to be multiplexed on the PUSCH, or a size for the HARQ feedback. The apparatus may communicate, with the network entity, in accordance with the UL-DAI indication. Numerous other aspects are described.

30 Claims, 8 Drawing Sheets

400 —▸

(56)             References Cited

OTHER PUBLICATIONS

TD Tech., et al., "Open Issues on Reliability for NR MBS", 3GPP TSG RAN WG1 Meeting#108-e, R1-2201595, 3rd Generation Partnership Project, Mobile Competence Centre, 650, Route Des Lucioles, F-06921 Sophia-Antipolis Cedex, France, vol. RAN WG1, No. e-Meeting, Feb. 21-Mar. 3, 2022, Feb. 10, 2022, 3 Pages, XP052107257, The whole document.

Vivo: "Remaining Issues on Mechanisms to Improve Reliability for RRC_CONNECTED UEs", 3GPP TSG RAN WG1 #107bis-e, R1-2200095, 3rd Generation Partnership Project, Mobile Competence Centre, 650, Route Des Lucioles, F-06921 Sophia-Antipolis Cedex, France, vol. RAN WG1, No. e-Meeting, Jan. 17-Jan. 25, 2022, Jan. 11, 2022, 8 Pages, XP052092940, The whole document.

* cited by examiner

400

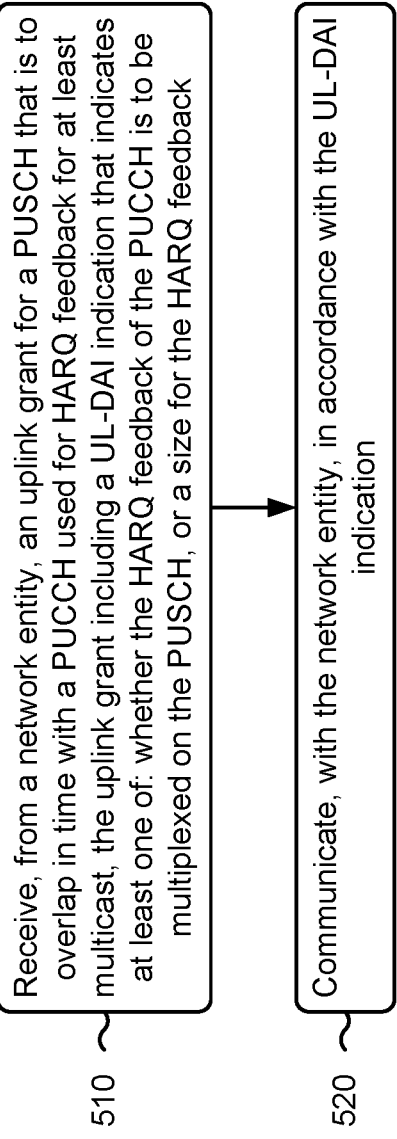

500

510 Receive, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback 520 Communicate, with the network entity, in accordance with the UL-DAI indication

610 Transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback 620 Communicate in accordance with the UL-DAI indication

HYBRID AUTOMATIC REPEAT REQUEST FEEDBACK FOR MULTICAST

CROSS-REFERENCE TO RELATED APPLICATION

This Patent Application claims priority to U.S. Provisional Patent Application No. 63/267,841, filed on Feb. 11, 2022, entitled "HYBRID AUTOMATIC REPEAT REQUEST FEEDBACK FOR MULTICAST," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request feedback for multicast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some scenarios, a physical uplink control channel (PUCCH) carrying multicast hybrid automatic repeat request (HARQ) acknowledgment (HARQ-ACK) feedback may overlap (e.g., in time, or in time and in frequency) with a physical uplink shared channel (PUSCH) of the same priority. Here, the HARQ-ACK feedback of the PUCCH may be multiplexed on the PUSCH. However, in such scenarios, wireless networks generally lack support for techniques to indicate, in an uplink grant, a downlink assignment index (UL-DAI) applicable for multicast HARQ-ACK feedback associated with multiple multicast radio network temporary identifiers (RNTIs). In some scenarios, a PUCCH carrying unicast and multicast HARQ-ACK feedback may overlap (e.g., in time, or in time and in frequency) with a PUSCH of the same priority. Here, the HARQ-ACK feedback of the PUCCH may be multiplexed on the PUSCH. However, in such scenarios, wireless networks generally lack support for techniques to indicate, in an uplink grant, a UL-DAI applicable for unicast HARQ-ACK feedback associated with a unicast RNTI and for multicast HARQ-ACK feedback associated with one or more multicast RNTIs. Accordingly, in the scenarios above, a user equipment (UE) may report the feedback in an unexpected manner, which may consume network resources associated with the reporting, may affect a performance of communications to the UE, may result in excessive retransmissions, or the like.

Some techniques and apparatuses described herein provide schemes for UL-DAI indication in an uplink grant when a PUCCH that is to carry at least multicast HARQ feedback overlaps (e.g., in time, or in time and in frequency) with a PUSCH (e.g., of the same priority as the PUCCH). For example, the HARQ feedback may be for multicast only or for multicast and for unicast. In some aspects, a UL-DAI may indicate whether the HARQ feedback is to be multiplexed on the PUSCH and/or a size for the HARQ feedback. In some aspects, a UL-DAI may be applicable for (e.g., the indication of the UL-DAI may pertain to) multicast HARQ feedback associated with multiple multicast RNTIs. In some aspects, a UL-DAI may be applicable for unicast HARQ feedback and for multicast HARQ feedback associated with one or more multicast RNTIs. Accordingly, techniques and apparatuses described herein reduce consumption of network resources associated with HARQ feedback reporting, improve a performance of communications to a UE, and reduce excessive retransmissions.

Some aspects described herein relate to a method of wireless communication performed by an apparatus of a UE. The method may include receiving, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The method may include communicating, with the network entity, in accordance with the UL-DAI indication.

Some aspects described herein relate to a method of wireless communication performed by an apparatus of a network entity. The method may include transmitting, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The method may include communicating in accordance with the UL-DAI indication.

Some aspects described herein relate to an apparatus for wireless communication at a UE. The apparatus may include a memory and one or more processors coupled to the memory. The one or more processors may be configured to receive, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The one or more processors may be configured to communicate, with the network entity, in accordance with the UL-DAI indication.

Some aspects described herein relate to an apparatus for wireless communication at a network entity. The apparatus may include a memory and one or more processors coupled to the memory. The one or more processors may be configured to transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The one or more processors may be configured to communicate in accordance with the UL-DAI indication.

Some aspects described herein relate to a non-transitory computer-readable medium that stores a set of instructions for wireless communication. The set of instructions, when executed by one or more processors of a UE, may cause the UE to receive, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The set of instructions, when executed by one or more processors of the UE, may cause the UE to communicate, with the network entity, in accordance with the UL-DAI indication.

Some aspects described herein relate to a non-transitory computer-readable medium that stores a set of instructions for wireless communication by a network entity. The set of instructions, when executed by one or more processors of the network entity, may cause the network entity to transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The set of instructions, when executed by one or more processors of the network entity, may cause the network entity to communicate in accordance with the UL-DAI indication.

Some aspects described herein relate to an apparatus for wireless communication. The apparatus may include means for receiving, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The apparatus may include means for communicating, with the network entity, in accordance with the UL-DAI indication.

Some aspects described herein relate to an apparatus for wireless communication. The apparatus may include means for transmitting, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The apparatus may include means for communicating in accordance with the UL-DAI indication.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-6 are diagrams illustrating example processes associated with HARQ feedback for multicast, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
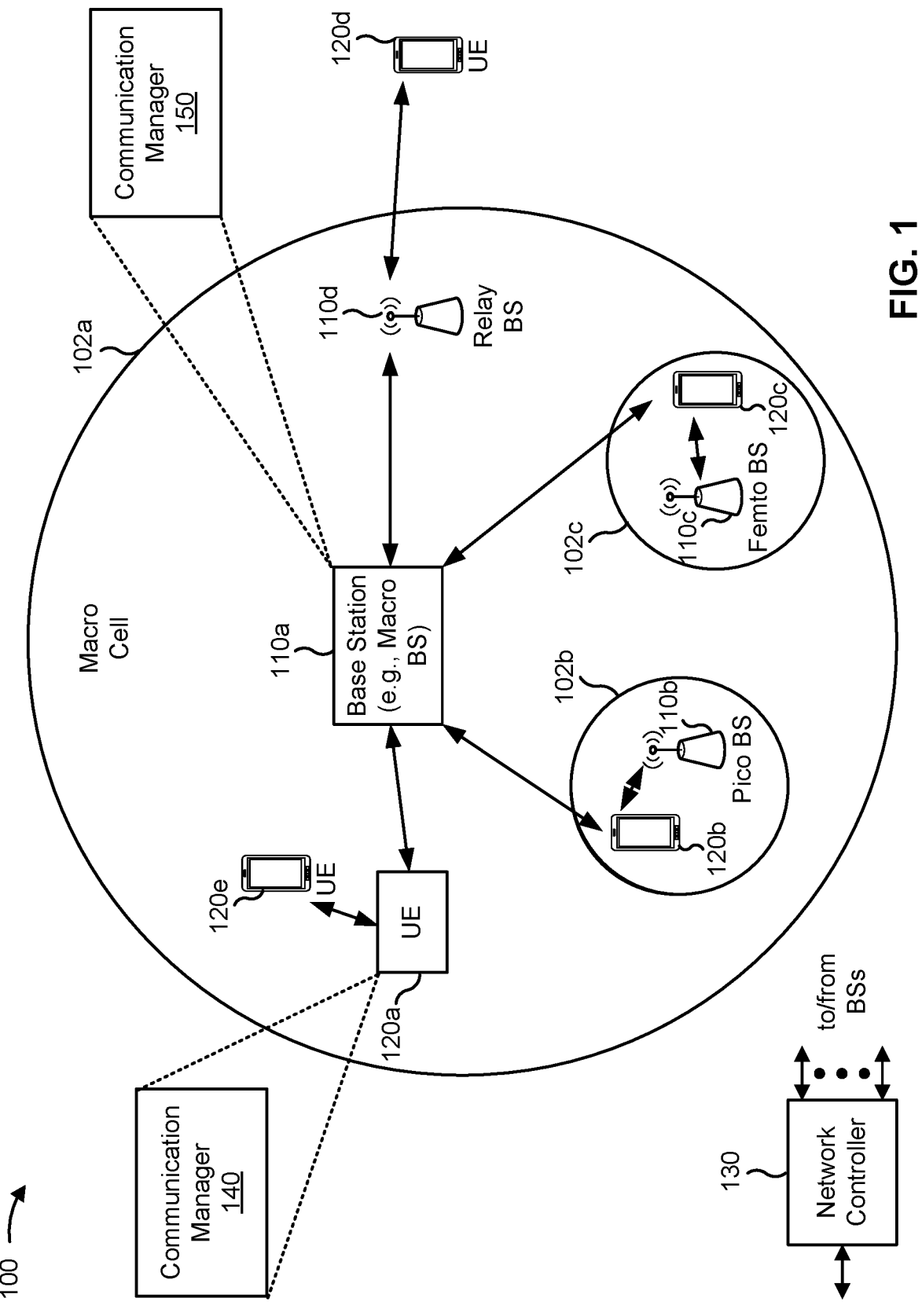
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, an uplink grant for a physical uplink shared channel (PUSCH) that is to overlap in time with a physical uplink control channel (PUCCH) used for hybrid automatic repeat request (HARQ) feedback for at least multicast, the uplink grant including a downlink assignment index (UL-DAI) indication that indicates at least one of: whether the HARQ feedback of the PUCCH is to be multiplexed on the PUSCH, or a size for the HARQ feedback; and communicate, with the network entity, in accordance with the UL- DAI indication. Additionally, or alternatively, the communication manager 140 may perform one or more other operations described herein.

In some aspects, a network entity (e.g., a base station 110) may include a communication manager 150. As described in more detail elsewhere herein, the communication manager 150 may transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback; and communicate in accordance with the UL-DAI indication. Additionally, or alternatively, the communication manager 150 may perform one or more other operations described herein.

As indicated above, FIG. 1 is provided as an example. Other examples may differ from what is described with regard to FIG. 1.

Figure 2:
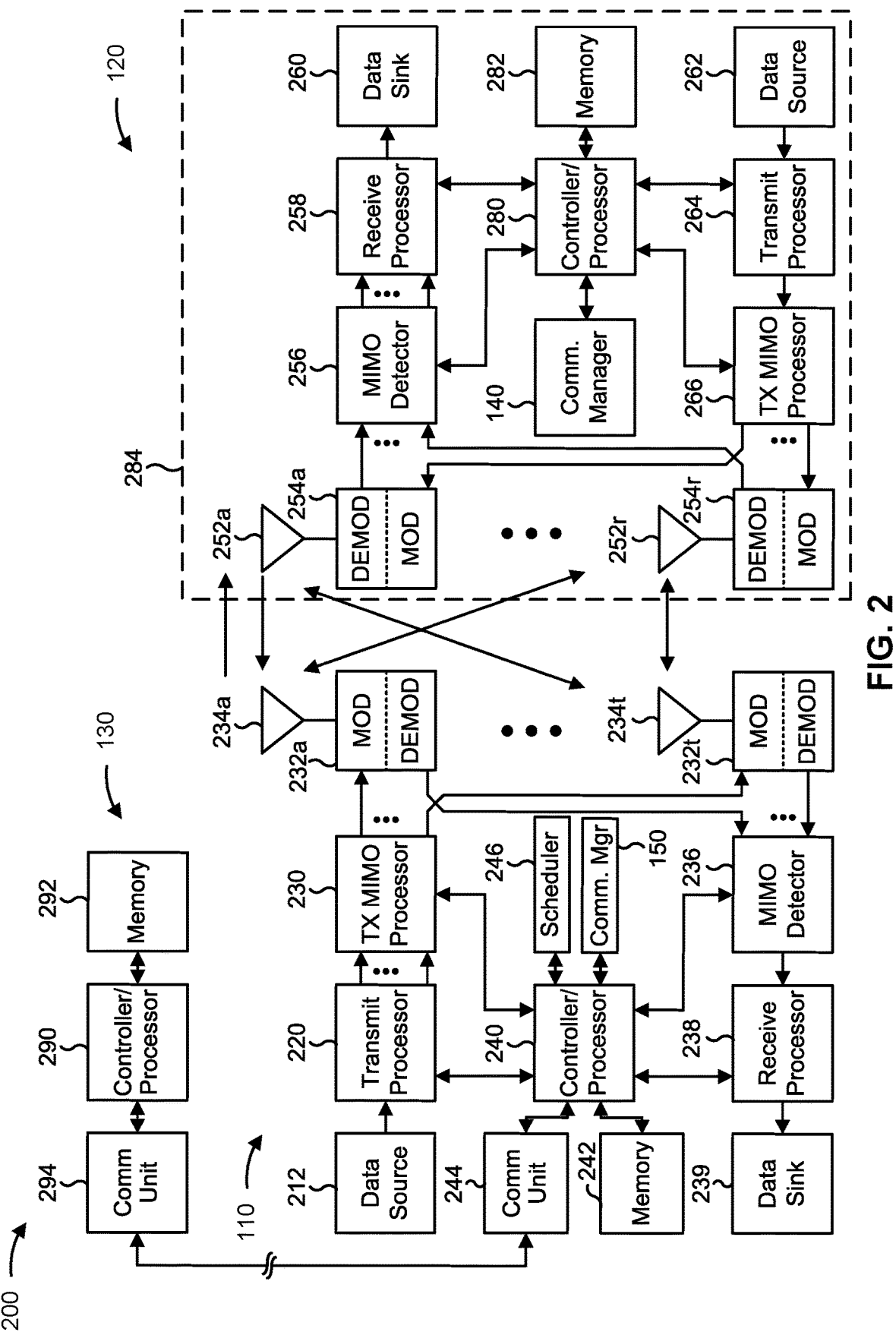
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with HARQ feedback for multicast, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback; and/or means for communicating, with the network entity, in accordance with the UL-DAI indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity (e.g., base station 110) includes means for transmitting, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback; and/or means for communicating in accordance with the UL-DAI indication. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
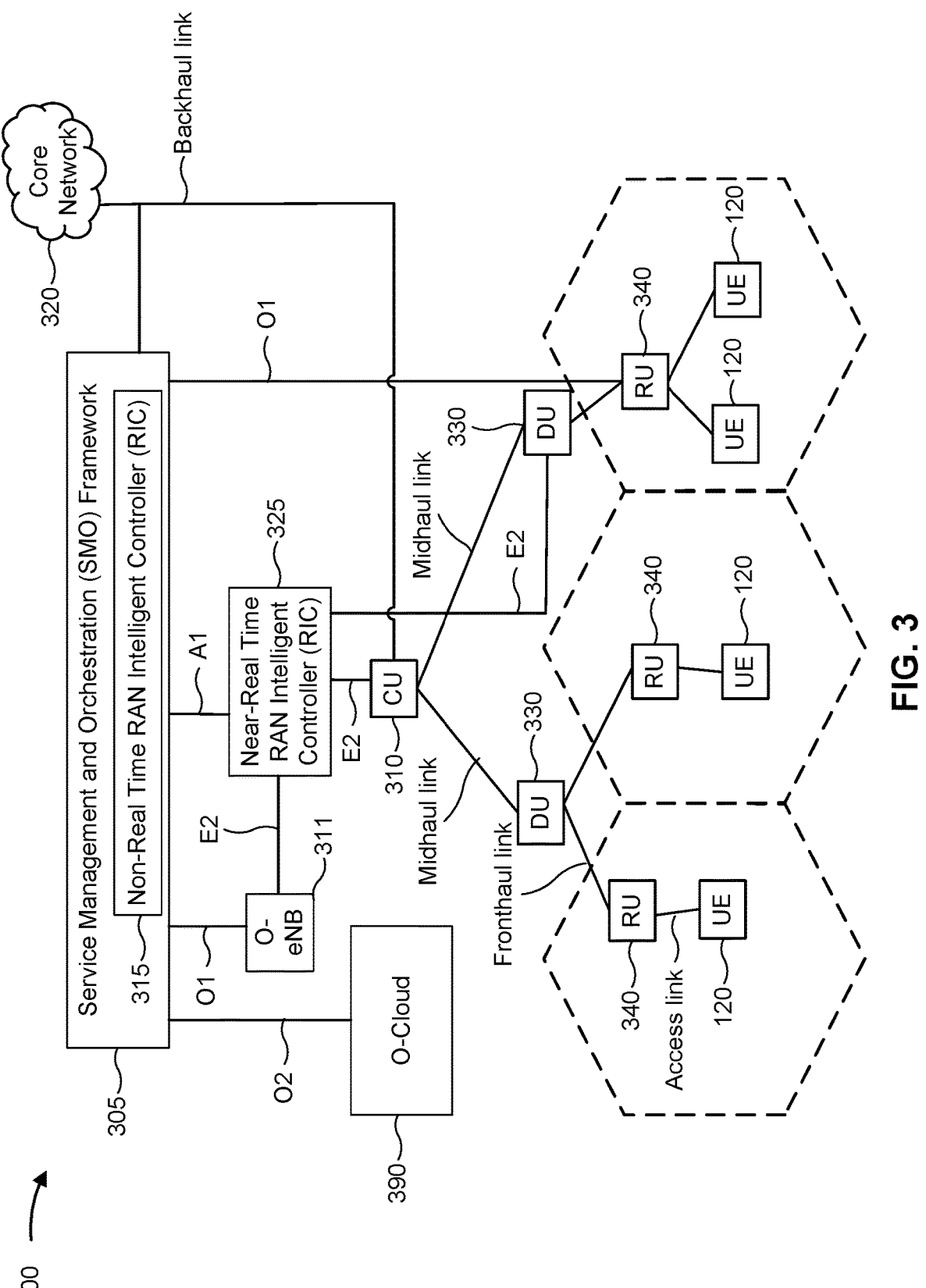
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML, models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

HARQ is a procedure that is used between wireless communication devices in a wireless network. HARQ may be used to manage retransmissions and recovery of over-the-air (OTA) data in the wireless network. For example, HARQ may include techniques for tracking acknowledge-ment (ACK) feedback and/or negative acknowledgment (NACK) feedback for communications in the wireless net-work. In some contexts, HARQ feedback may be referred to as HARQ-ACK feedback.

A UE may provide multicast HARQ-ACK feedback in a physical uplink control channel (PUCCH). A HARQ-ACK codebook (i.e., a sequence of bits representing ACK or NACK feedback for one or more communications) may be separately configured for a UE for multicast and unicast. For multicast, the codebook configured for the UE may be a type 1 codebook (i.e., a semi-static codebook that has a fixed size), a type 2 codebook (i.e., a dynamic codebook that has a size that changes according to resource allocation), or the like. The codebook configured for the UE for multicast may be applied to multicast transmissions associated with all group radio network temporary identifiers (G-RNTIs) (e.g., G-RNTIs or group configured scheduling radio network temporary identifiers (G-CS-RNTIs)) configured for the UE. For multicast, HARQ-ACK feedback may be configured as ACK/NACK-based feedback or NACK-only-based feed-back per G-RNTI or per G-CS-RNTI. When a PUCCH for multicast feedback is overlapping with PUSCH, ACK/NACK-based feedback, if configured for a G-RNTI, may be multiplexed in the PUSCH, and NACK-only-based feed-back, if configured for a G-RNTI, may be transformed into ACK/NACK-based feedback and multiplexed in the PUSCH. For unicast, the codebook configured for the UE may be a type 1 codebook, a type 2 codebook, a type 2 enhanced codebook (i.e., a dynamic codebook that supports grouping of HARQ feedback), or the like. The codebook that is configured for the UE for unicast may be applied to unicast transmissions associated with a cell radio network temporary identifier (C-RNTI) configured for the UE.

For type 1 codebook generation, a UE may multiplex HARQ feedback for unicast and multicast with the same priority on the same PUCCH. In some examples, the UE may use a time division multiplexing (TDM) pattern. Here, the UE may count physical downlink shared channel (PDSCH) reception candidate occasions, for purposes of identifying a size for HARQ feedback, according to a first mode (mode 1) or a second mode (mode 2). A set of PDSCH-to-HARQ feedback timing values (which may be referred to as a "k1" values) for unicast may be referred to as set A and a set of k1 values for multicast may be referred to as set B. In mode 1, for k1 values in the intersection of set A and set B, counting may be based on a union of PDSCH time domain resource allocation (TDRA) sets for unicast and multicast; for k1 values in set A but not in set B counting may be based on a PDSCH TDRA set for unicast, and for k1 values in set B but not in set A, counting may be based on a PDSCH TDRA set for multicast. In mode 2, for k1 values in the union of set A and set B, counting may be based on the union of the PDSCH TDRA sets for unicast and multi-cast. In some examples, the UE may use a frequency division multiplexing (FDM) pattern. Here, HARQ-ACK bits for all PDSCH occasions over all slots for serving cells for unicast precede HARQ-ACK bits for all PDSCH occa-sions over all slots for all serving cells for multicast. If the UE is not configured to receive unicast and multicast that is frequency division multiplexed, then the UE may generate a type 1 codebook using a TDM pattern, as described herein.

Otherwise, the UE may generate a type 1 codebook using an FDM pattern, as described herein.

For type 2 codebook generation, a UE may multiplex HARQ feedback for unicast and multicast with the same priority on the same PUCCH. The UE may concatenate a type 2 codebook for unicast and one or more type 2 codebooks for multicast in the same PUCCH resource. A downlink assignment index (DAI) for unicast may be sepa-rately counted from a DAI for multicast, and DAIS for multicast may be separately counted per G-RNTI. A first type 2 sub-codebook for unicast may precede a second type 2 sub-codebook for multicast. Moreover, a type 2 codebook may be generated by concatenating type 2 sub-codebooks for each G-RNTI in an ascending order of G-RNTI values.

A UE may provide multicast HARQ-ACK feedback in a PUSCH. For ACK/NACK-based HARQ-ACK feedback for multicast, the UE may use a multiplexing/prioritizing rule between HARQ-ACK for multicast and a scheduling request (SR)/channel state information (CSI). The multiplexing/prioritizing rule may be similar to that used by the UE for multiplexing/prioritizing HARQ-ACK for unicast and an SR/CSI. If a PUCCH carrying only multicast HARQ-ACK overlaps with a PUSCH associated with the same priority as the PUCCH, the UE may use an uplink (UL)-DAI (e.g., a DAI indicated in an uplink grant) that indicates the quantity of HARQ-ACK bits for multicast (e.g., in a similar manner in which a UL-DAI is used for unicast HARQ-ACK). The UL-DAI may be applicable to a single G-RNTI or applicable to all configured G-RNTIs of the UE.

The UE may multiplex unicast and multicast HARQ-ACK with the same priority onto the same PUSCH in several scenarios. If the unicast and the multicast HARQ-ACK codebooks are both type 1 codebooks, then a single-bit UL-DAI set to a value of "1" indicates that the UE is to multiplex unicast and multicast HARQ-ACK codebooks onto the same PUSCH, or a two-bit UL-DAI separately (e.g., per bit) indicates whether the UE is to multiplex unicast and/or multicast HARQ-ACK codebooks onto the same PUSCH. The indication of the UL-DAI may be applicable to a single G-RNTI or applicable to all configured G-RNTIs of the UE. If the unicast and the multicast HARQ-ACK codebooks are both type 2 codebooks, then the appli-cability of the UL-DAI may be downselected from the following: a two-bit UL-DAI may be applicable to both the unicast and the multicast HARQ-ACK codebooks, or one or more two-bit UL-DAIs may be included in downlink control information (DCI) for multicast in addition to a two-bit UL-DAI for unicast. Here, a single UL-DAI field may be applicable to all G-RNTIs configured for the UE, or separate UL-DAI fields may be applicable respectively to each G-RNTI configured for the UE. Wireless networks may lack support for handling scenarios in which the unicast and the multicast HARQ-ACK codebooks are different types of codebooks.

A UE may provide unicast HARQ-ACK feedback in a PUSCH. Unicast HARQ-ACK feedback may be multi-plexed in a PUSCH based on a UL-DAI. The UL-DAI (e.g., the DAI field in an uplink grant) may indicate whether HARQ-ACK feedback is to be transmitted in a slot (e.g., for a type 1 codebook) or a quantity of HARQ-ACK informa-tion bits (e.g., for a type 2 codebook or an enhanced type 2 codebook). The inclusion and/or the size of a UL-DAI in DCI may be based on a format of the DCI. DCI in format 0_0 may not include a UL-DAI in an uplink grant. DCI in format 0_1 may include a UL-DAI that uses 1, 2, 4, or 8 bits. The DCI may include a first UL-DAI that uses 1, 2, or 4 bits. One bit may be used if the UE is configured with a type 1

HARQ-ACK codebook for unicast downlink PDSCH. Two bits may be used if the UE is configured with a type 2 or an enhanced type 2 HARQ-ACK codebook for unicast downlink PDSCH without a parameter UL-TotalDAI-Included (e.g., that indicates whether the total DAI fields of an additional PDSCH group is included in the DCI) configured for the UE. Four bits may be used if the UE is configured with an enhanced type 2 HARQ-ACK codebook for unicast downlink PDSCH when the parameter UL-TotalDAI-Included is set to "true" (e.g., for NR in unlicensed spectrum (NR-U)). The DCI may include a second UL-DAI that uses 0, 2, or 4 bits. Two bits may be used if the UE is configured with a type 2 or an enhanced type 2 HARQ-ACK codebook, with two HARQ-ACK sub-codebooks, for unicast downlink PDSCH without the parameter UL-TotalDAI-Included configured for the UE. Four bits may be used if the UE is configured with an enhanced type 2 HARQ-ACK codebook, with two HARQ-ACK sub-codebooks, for unicast downlink PDSCH when the parameter UL-TotalDAI-Included is set to "true." Zero bits may be used otherwise.

DCI in format 0_2 may include a UL-DAI that uses 0, 1, 2, or 4 bits (e.g., enhanced type 2 codebook is not supported). Zero bits may be used if a parameter relating to DAI for DCI format 0_2 is not configured for the UE (e.g., the parameter downlinkAssignmentIndexDCI-0-2 is not configured for the UE). The DCI may include a first UL-DAI that uses 1 or 2 bits. One bit may be used if the UE is configured with a type 1 HARQ-ACK codebook for unicast downlink PDSCH. Two bits may be used if the UE is configured with a type 2 HARQ-ACK codebook for unicast downlink PDSCH. The DCI may include a second UL-DAI that uses 0 or 2 bits. Two bits may be used if the UE is configured with a type 2 HARQ-ACK codebook, with two HARQ-ACK sub-codebooks, for unicast downlink PDSCH. Zero bits may be used otherwise.

In some scenarios, a PUCCH carrying multicast HARQ-ACK feedback may overlap (e.g., in time, or in time and in frequency) with a PUSCH of the same priority. Here, the HARQ-ACK feedback of the PUCCH may be multiplexed on the PUSCH. However, in such scenarios, wireless networks generally lack support for techniques to indicate, in an uplink grant, a UL-DAI applicable for multicast HARQ-ACK feedback associated with multiple G-RNTIs. In some scenarios, a PUCCH carrying unicast and multicast HARQ-ACK feedback may overlap (e.g., in time, or in time and in frequency) with a PUSCH of the same priority. Here, the HARQ-ACK feedback of the PUCCH may be multiplexed on the PUSCH. However, in such scenarios, wireless networks generally lack support for techniques to indicate, in an uplink grant, a UL-DAI applicable for unicast HARQ-ACK feedback associated with a C-RNTI and for multicast HARQ-ACK feedback associated with one or more G-RNTIs. Accordingly, in the scenarios above, a UE may report the feedback in an unexpected manner, which may consume network resources associated with the reporting, may affect a performance of communications to the UE, may result in excessive retransmissions, or the like.

Some techniques and apparatuses described herein provide schemes for UL-DAI indication in an uplink grant when a PUCCH that is to carry at least multicast HARQ feedback overlaps (e.g., in time, or in time and in frequency) with a PUSCH (e.g., of the same priority as the PUCCH). For example, the HARQ feedback may be for multicast only or for multicast and for unicast. In some aspects, a UL-DAI may indicate whether the HARQ feedback is to be multiplexed on the PUSCH and/or a size for the HARQ feedback. In some aspects, a UL-DAI may be applicable for (e.g., the indication of the UL-DAI may pertain to) multicast HARQ feedback associated with multiple G-RNTIs. In some aspects, a UL-DAI may be applicable for unicast HARQ feedback and for multicast HARQ feedback associated with one or more G-RNTIs. Accordingly, techniques and apparatuses described herein reduce consumption of network resources associated with HARQ feedback reporting, improve a performance of communications to a UE, and reduce excessive retransmissions.

Figure 4:
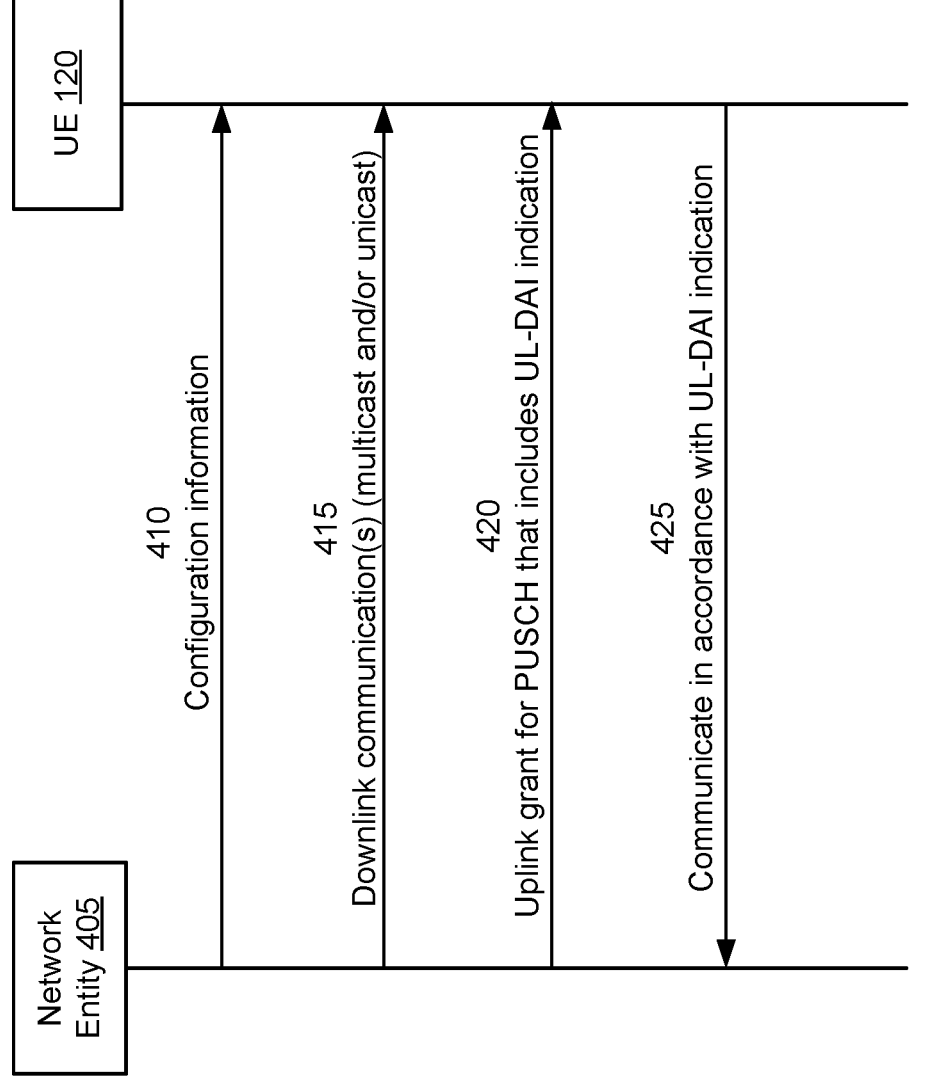
FIG. 4 is a diagram illustrating an example associated with hybrid automatic repeat request (HARQ) feedback for multicast, in accordance with the present disclosure.

FIG. 4 is a diagram of an example 400 associated with HARQ feedback for multicast, in accordance with the present disclosure. As shown in FIG. 4, a network entity 405 (e.g., a base station 110, a CU 310, a DU 330, an RU 340, or the like) and a UE 120 may communicate. In some aspects, the network entity 405 and the UE 120 may be part of a wireless network (e.g., wireless network 100).

As shown by reference number 410, the network entity 405 may transmit, and the UE 120 may receive, configuration information. In some aspects, the UE 120 may receive the configuration information via one or more of radio resource control (RRC) signaling, one or more medium access control (MAC) control elements (CEs), and/or DCI, among other examples. In some aspects, the configuration information may include an indication of one or more configuration parameters (e.g., already known to the UE 120 and/or previously indicated by the network entity 405) for selection by the UE 120, and/or explicit configuration information for the UE 120 to use to configure the UE 120, among other examples.

In some aspects, the configuration information may indicate a codebook type that the UE 120 is to use for HARQ feedback for unicast transmissions. In some aspects, the configuration information may indicate a codebook type that the UE 120 is to use for HARQ feedback for multicast transmissions. The codebook type for unicast and the codebook type for multicast may be the same codebook type or different codebook types. As described in further detail herein, the configuration information may include information relating to UL-DAI indication.

In some aspects, the configuration information may indicate one or more multicast radio network temporary identifiers (RNTIs). A multicast RNTI configured for the UE 120 may be associated with a multicast service, and the UE 120 may use the multicast RNTI to receive (e.g., unscramble) multicast transmissions associated with the multicast service. A multicast RNTI may be a G-RNTI (e.g., for dynamically scheduled multicast transmissions) or a G-CS-RNTI (e.g., for semi-persistently scheduled multicast transmissions). References herein to a G-RNTI are equally applicable for a G-CS-RNTI. In some aspects, the configuration information may indicate one or more C-RNTIs for the UE 120. A C-RNTI configured for the UE 120 may identify the UE 120 for a serving cell of the UE 120 (e.g., the UE 120 may use the C-RNTI to receive a unicast transmission for the UE 120).

As shown by reference number 415, the network entity 405 may transmit, and the UE 120 may receive, one or more downlink communications (e.g., PDSCH communications). For example, the one or more downlink communications may include one or more unicast transmissions and/or one or more multicast transmissions. As described herein, the UE 120 may transmit HARQ feedback for the one or more downlink communications (e.g., based at least in part on whether the UE 120 successfully received and/or decoded the one or more downlink communications).

As shown by reference number 420, the network entity 405 may transmit, and the UE 120 may receive, an uplink grant for a PUSCH that is to overlap in time (e.g., fully or partially) and/or in frequency (e.g., fully or partially) with a PUCCH used for (e.g., that is to carry) HARQ feedback for at least multicast. In some aspects, the UE 120 may receive the uplink grant prior to the one or more downlink communications, in between multiple downlink communications, or after the one or more downlink communications.

The PUSCH and the PUCCH may be associated with the same priority. The HARQ feedback may be for only multicast or for unicast and multicast (e.g., in accordance with whether the one or more downlink communications are for only multicast or for unicast and multicast). The HARQ feedback may be ACK/NACK-based feedback or NACK-only-based feedback. The HARQ feedback may be for dynamic scheduling multicast PDSCHs (e.g., associated with G-RNTIs configured for the UE 120) and/or for semi-persistent scheduling (SPS) multicast PDSCHs or releases (e.g., associated with G-CS-RNTIs configured for the UE 120).

The uplink grant may include a UL-DAI indication. The UL-DAI indication may indicate whether the HARQ feedback of the PUCCH is to be multiplexed on the PUSCH and/or a size for the HARQ feedback (e.g., a quantity of information bits for the HARQ feedback). For example, the UL-DAI indication may indicate a quantity of bits for the HARQ feedback for multicast. In some aspects, support for using a UL-DAI for multiplexing unicast and multicast HARQ feedback in the same PUSCH may be subject to a UE capability of the UE 120 for multiplexing unicast and multicast HARQ feedback in the same PUSCH. In some aspects, support for using a UL-DAI for multiplexing HARQ feedback associated with multiple multicast RNTIs (e.g., G-RNTIs) or multicast RNTI (e.g., G-RNTI) groups in the same PUSCH may be subject to a UE capability of the UE 120 for multiplexing HARQ feedback associated with multiple multicast RNTIs or multicast RNTI groups in the same PUSCH.

In some aspects, the HARQ feedback may be for only multicast and the UE 120 may be configured to use a semi-static HARQ codebook (e.g., a type 1 codebook) for multicast. Here, the UL-DAI indication may include a single bit that is commonly applicable for one or more multicast RNTIs (e.g., all multicast RNTIs) configured for the UE 120 for a cell (e.g., per cell). This is feasible because candidate PDSCH occasions, based on a TDRA table, are common for all multicast RNTIs (e.g., G-RNTIs or G-CS-RNTIs) in a cell, and if the UE 120 supports up to one PDSCH associated with one of the multicast RNTIs being transmitted per PDSCH occasion. As used herein, the UL-DAI indication being "applicable" for a multicast RNTI may refer to the UL-DAI indication pertaining to HARQ feedback for one or more multicast transmissions for a multicast service associated with the multicast RNTI.

In some aspects, the HARQ feedback may be for only multicast and the UE 120 may be configured to use a dynamic HARQ codebook (e.g., a type 2 codebook) for multicast. Here, the UL-DAI indication may include one or more multiple-bit (e.g., two bit) UL-DAIs that are respectively applicable per multicast RNTI or per multicast RNTI group configured for the UE. In other words, the UL-DAI indication may include separate multiple-bit UL-DAI fields $$\left(V_{T-DAI}^{UL}\right)$$

that are applicable per multicast RNTI (e.g., per G-RNTI) or per multicast RNTI group. A value of a UL-DAI field may be according to a table provisioned for the UE 120 that maps UL-DAI values to PDSCH counting values (e.g., Table 9.1.3-2 of 3GPP Technical Specification (TS) 38.213). Using separate UL-DAI fields, the UL-DAI indication may include two bits, four bits, or eight bits that are applicable for one multicast RNTI, two multicast RNTIs, or four multicast RNTIs, respectively. For example, a total number of UL-DAI bits indicated in the uplink grant (e.g., 1, 2, 4, or 8 bits in DCI format 0_1, or 2 or 4 bits in DCI format 0_2) may be split among the multicast RNTIs or among the multicast RNTI groups configured for the UE 120. Alternatively, when the HARQ feedback is for only multicast and the UE 120 is configured to use a dynamic HARQ codebook for multicast, the UL-DAI indication may include multiple bits (e.g., two bits) that are commonly applicable to one or more multicast RNTIs (e.g., all multicast RNTIs) configured for the UE 120 or a subset of the one or more multicast RNTIs (e.g., a subset of all multicast RNTIs configured for the UE 120 to be multiplexed in the PUSCH). In some aspects, when the HARQ feedback is for only multicast and the UE 120 is configured to use a dynamic HARQ codebook for multicast, the UE 120 may support a scheme that uses separately applicable UL-DAIs or a scheme that uses a commonly applicable UL-DAI, and the configuration information received by the UE 120 (e.g., an RRC configuration) may indicate the scheme that is to be used.

In some aspects, the HARQ feedback may be for unicast and for multicast (e.g., if the UE 120 supports multiplexing HARQ feedback for unicast and multicast on the same PUSCH) and the UE 120 may be configured to use a semi-static HARQ codebook (e.g., a type 1 codebook) for unicast and for multicast. Here, the UL-DAI indication may include a single bit that is commonly applicable for unicast and for one or more multicast RNTIs (e.g., all multicast RNTIs) configured for the UE 120. That is, the single bit may be commonly applicable for unicast and for multicast. In other words, the single bit of the UL-DAI indication (e.g., in DCI format 0_1 or 0_2) may be commonly applicable for a C-RNTI and one or more G-RNTIs. As an example, a value of 0 for the single bit may indicate that HARQ feedback for unicast and for multicast is not to be multiplexed on the PUSCH, and a value of 1 for the single bit may indicate that HARQ feedback for both unicast and for multicast is be multiplexed on the PUSCH.

Alternatively, when the HARQ feedback is for unicast and for multicast and the UE 120 is configured to use a semi-static HARQ codebook (e.g., a type 1 codebook) for unicast and for multicast, the UL-DAI indication may include a first single bit that is applicable for unicast and a second single bit that is applicable for one or more multicast RNTIs (e.g., all multicast RNTIs) configured for the UE 120. That is, separate bits of the UL-DAI indication may be respectively applicable for unicast and multicast. In other words, the UL-DAI indication (e.g., in DCI format 0_1 or 0_2) may include two bits, where a first bit is applicable for a C-RNTI and the second bit is applicable for one or more G-RNTIs (e.g., all G-RNTIs configured for the UE 120). As an example, a value of 00 for the two bits may indicate that HARQ feedback for unicast and for multicast is not to be multiplexed on the PUSCH, a value of 01 for the two bits may indicate that HARQ feedback for only unicast is to be multiplexed on the PUSCH, a value of 10 for the two bits may indicate that HARQ feedback for only multicast is to be multiplexed on the PUSCH, and a value of 11 may indicate that HARQ feedback for both unicast and for multicast is be multiplexed on the PUSCH.

In some aspects, when the HARQ feedback is for unicast and for multicast and the UE 120 is configured to use a semi-static HARQ codebook (i.e., a type 1 codebook) for unicast and for multicast, the UE 120 may support a scheme that uses separately applicable bits or a scheme that uses a commonly applicable bit, and the configuration information received by the UE 120 (e.g., an RRC configuration) may indicate the scheme that is to be used. In some aspects, the configuration information may include an explicit parameter (e.g., an RRC parameter) for configuring the scheme. In some aspects, the scheme may be indicated implicitly by one or more other parameters (e.g., RRC parameters) of the configuration information, such as parameters relating to PUCCH type 1 codebook generation for multiplexing unicast and multicast.

In some aspects, the UL-DAI indication may include the single bit that is commonly applicable for unicast and for the one or more multicast RNTIs (e.g., the scheme that uses a commonly applicable bit may be used) responsive to a configuration of the UE 120 that results in PDSCH occasions being commonly counted for unicast and multicast, and thus a joint codebook using TDM for multiplexing unicast and multicast feedback is generated. Otherwise, the UL-DAI indication may include the first single bit that is applicable for unicast and the second single bit that is applicable for one or more multicast RNTIs (e.g., the scheme that uses separately applicable bits). In one example, PDSCH occasions may be commonly counted for unicast and multicast when the UE 120 is configured with the same TDRA and/or k1 value for both unicast and multicast (e.g., a particular TDRA and/or k1 value is not configured for multicast). Additionally, or alternatively, PDSCH occasions may be commonly counted for unicast and multicast when the UE 120 is configured for type 1 codebook generation using TDM for multiplexing unicast and multicast HARQ feedback based on a union set of TDRA/k1 for unicast and multicast (e.g., an fdmed-Reception-Multicast parameter is not configured for the UE 120 and a type 1-Codebook-Generation-Mode parameter set to mode 2 is configured for the UE 120 (with a union set of TDRA/k1 for unicast and multicast)). In other words, if a codebook using FDM for multiplexing unicast and multicast feedback (e.g., an fdmed-Reception-Multicast parameter is configured), or a type 1-Codebook-Generation-Mode parameter set to mode 1, is configured for the UE 120, an UL-DAI bit for unicast and an UL-DAI bit for multicast RNTI(s) may be applied respectively.

In some aspects, the HARQ feedback may be for unicast and for multicast (e.g., if the UE 120 supports multiplexing HARQ feedback for unicast and multicast on the same PUSCH) and the UE 120 may be configured to use a dynamic HARQ codebook (e.g., a type 2 codebook) for unicast and for multicast (e.g., where the multicast HARQ-ACK codebook may be a type 2 codebook and the unicast HARQ-ACK codebook may be a type 2 codebook or an enhanced type 2 codebook). Here, the UL-DAI indication may include multiple bits (e.g., two bits) that are commonly applicable for unicast and for one multicast RNTI configured for the UE 120 or a group of multicast RNTIs configured for the UE 120. In other words, the UL-DAI indication may include multiple bits (e.g., two bits) that are commonly applicable for a unicast C-RNTI and one, or a group of, multicast G-RNTIs. Since a downlink grant DAI may be separately counted for unicast and multicast, the network entity 405 may split the UL-DAI bits to unicast and multicast without increasing a maximum field size of the UL-DAI indication in the uplink grant.

Alternatively, when the HARQ feedback is for unicast and for multicast and the UE 120 is configured to use a dynamic HARQ codebook for unicast and for multicast, the UL-DAI indication may include a first multiple-bit (e.g., two bit) UL-DAI that is applicable for unicast and a second multiple-bit (e.g., two bit) UL-DAI that is applicable for one multicast RNTI configured for the UE 120 or a group of multicast RNTIs configured for the UE 120. In other words, the UL-DAI indication may include a multiple-bit (e.g., two bit) UL-DAI field that is applicable for only a unicast C-RNTI and an additional multiple-bit (e.g., two bit) UL-DAI field that is applicable for one, or a group of, multicast G-RNTIs.

As an example, the UL-DAI indication (e.g., in DCI format 0_1 or 0_2) may include a total of four bits to support indication for unicast and multicast multiplexing in a PUSCH. Here, the UL-DAI indication may include a first multiple-bit (e.g., two bit) UL-DAI applicable for unicast when the UE 120 is not configured for the total DAI fields of an additional PDSCH group to be included in DCI (e.g., a UL-TotalDAI-Included parameter is not configured) and the UE 120 is not configured for two HARQ sub-codebooks for unicast. Further, the UL-DAI indication may include a second multiple-bit (e.g., two bit) UL-DAI applicable for one multicast G-RNTI or a group of G-RNTIs (e.g., with multiple G-RNTIs).

As another example, the UL-DAI indication (e.g., in DCI format 0_1) may include a total of eight bits to support indication for unicast and multicast multiplexing in a PUSCH. Here, the UL-DAI indication may include a first multiple-bit (e.g., two bit) UL-DAI applicable for unicast when the UE 120 is not configured for the total DAI fields of an additional PDSCH group to be included in DCI (e.g., a UL-TotalDAI-Included parameter is not configured) and the UE 120 is not configured for two HARQ sub-codebooks for unicast, and the UL-DAI indication may include a second multiple-bit (e.g., six bit) UL-DAI applicable for multiple (e.g., up to three) multicast G-RNTIs or multiple groups of multicast G-RNTIs (e.g., each G-RNTI or group of G-RNTIs may be associated with two bits of the second UL-DAI). Alternatively, the UL-DAI indication may include a first multiple-bit (e.g., two bit) UL-DAI and a second multiple-bit (e.g., two bit) UL-DAI applicable for unicast when the UE 120 is not configured for the total DAI fields of an additional PDSCH group to be included in DCI (e.g., a UL-TotalDAI-Included parameter is not configured) but the UE 120 is configured for two HARQ sub-codebooks for unicast, and the UL-DAI indication may include a third multiple-bit (e.g., four bit) UL-DAI applicable for multiple (e.g., up to two) multicast G-RNTIs or multiple groups of multicast G-RNTIs (e.g., each G-RNTI or group of G-RN-TIs may be associated with two bits of the third UL-DAI). Alternatively, the UL-DAI indication may include a first multiple-bit (e.g., four bit) UL-DAI applicable for unicast when the UE 120 is configured for the total DAI fields of an additional PDSCH group to be included in DCI (e.g., a UL-TotalDAI-Included parameter is configured) and the UE 120 is not configured for two HARQ sub-codebooks for unicast, and the UL-DAI indication may include a second multiple-bit (e.g., four bit) UL-DAI applicable for multiple multicast G-RNTIs or multiple groups of multicast G-RN-TIs.

In some aspects (e.g., when the HARQ feedback is for unicast and for multicast and the UE 120 is configured to use a dynamic HARQ codebook for unicast and for multicast), whether the UL-DAI indication includes the multiple bits that are commonly applicable for unicast and multicast or the UL-DAI indication includes a first multiple-bit UL-DAI that is applicable for unicast and a second multiple-bit UL-DAI that is applicable for multicast may be based at least in part on a unicast HARQ feedback configuration of the UE 120 and/or a quantity of activated G-RNTIs that are configured for the UE 120.

In some aspects, when the HARQ feedback is for unicast and for multicast and the UE 120 is configured to use a dynamic HARQ codebook for unicast and for multicast, the UE 120 may support a scheme that uses commonly applicable bits or a scheme that uses separately applicable bits, and the configuration information received by the UE 120 (e.g., an RRC configuration) may indicate the scheme that is to be used. In some aspects, the configuration information may include an explicit parameter (e.g., an RRC parameter) for configuring the scheme. In some aspects, the scheme may be indicated implicitly by one or more other parameters (e.g., RRC parameters) of the configuration information, such as parameters relating to PUCCH type 2 codebook generation for multiplexing unicast and multicast.

In some aspects, the HARQ feedback may be for unicast and for multicast and the UE 120 may be configured to use a semi-static HARQ codebook for unicast (e.g., a type 1 codebook) and a dynamic HARQ codebook for multicast (e.g., a type 2 codebook). Here, the UL-DAI indication may include a first multiple-bit UL-DAI that is applicable for unicast and a second multiple-bit UL-DAI that is applicable for one or more multicast RNTIs configured for the UE 120 or one or more groups of multicast RNTIs configured for the UE 120. In other words, the UL-DAI indication may include separate UL-DAI fields for unicast and for multicast (e.g., when multiplexing unicast and multicast in a PUSCH). In some aspects, the first UL-DAI may include a first bit (e.g., a bit that is first in order or a bit that is second in order) that is applicable for unicast and a second bit that is set to a zero value (or another predefined value).

As an example, the UL-DAI indication (e.g., in DCI format 0_1 or 0_2) may include a total of four bits. Here, the first UL-DAI may include two bits and the second UL-DAI may include two bits. A first bit of the first UL-DAI may be applicable for unicast, and a second bit of the first UL-DAI may be a zero value (e.g., a 0 is inserted into the first UL-DAI) so that a size of the first UL-DAI matches a size of the second UL-DAI. Thus, the second UL-DAI may be applicable for one multicast G-RNTI or one group of multicast G-RNTIs. As another example, the UL-DAI indication (e.g., in DCI format 0_1 or 0_2) may include a total of eight bits. Here, the first UL-DAI may include two bits and the second UL-DAI may include six bits. A first bit of the first UL-DAI may be applicable for unicast, and a second bit of the first UL-DAI may be a zero value (e.g., a 0 is inserted into the first UL-DAI) so that a size of the first UL-DAI is two bits. Thus, the second UL-DAI may be applicable for multiple (e.g., up to three) multicast G-RNTIs or groups of multicast G-RNTIs.

In some aspects, the HARQ feedback may be for unicast and for multicast, and the UE 120 may be configured to use a dynamic HARQ codebook for unicast (i.e., a type 2 codebook or an enhanced type 2 codebook) and a semi-static HARQ codebook (i.e., a type 1 codebook) for multicast. Here, the UL-DAI indication may include a first multiple-bit UL-DAI that is applicable for unicast and a second multiple-bit UL-DAI that is applicable for one or more multicast RNTIs (e.g., all multicast RNTIs) configured for the UE 120. In other words, the UL-DAI indication may include separate UL-DAI fields for unicast and for multicast (e.g., when multiplexing unicast and multicast in a PUSCH). In some aspects, the second UL-DAI may include a first bit (e.g., a bit that is first in order or a bit that is second in order) that is applicable for the one or more multicast RNTIs and at least one second bit that is set to a zero value (or another predefined value).

As an example, the UL-DAI indication (e.g., in DCI format 0_1 or 0_2) may include a total of four bits. Here, the first UL-DAI may include two bits and the second UL-DAI may include two bits. The first UL-DAI may be applicable for unicast. A first bit of the second UL-DAI may be applicable for one or more multicast G-RNTIs (e.g., all multicast G-RNTIs) configured for the UE 120, and a second bit of the second UL-DAI may be a zero value (e.g., a 0 is inserted into the second UL-DAI) so that a size of the second UL-DAI matches a size of the first UL-DAI. As another example, the UL-DAI indication (e.g., in DCI format 0_1 or 0_2) may include a total of eight bits. Here, the first UL-DAI may include four bits and the second UL-DAI may include four bits. The first UL-DAI may be applicable for unicast. A first bit of the second UL-DAI may be applicable for one or more multicast G-RNTIs (e.g., all multicast G-RNTIs) configured for the UE 120, and the remaining three bits of the second UL-DAI may be a zero value (e.g., three 0s are inserted into the second UL-DAI) so that a size of the second UL-DAI matches a size of the first UL-DAI. Alternatively, two bits in the first UL-DAI and two bits in the second UL-DAI may be applicable for unicast, an additional bit in the first UL-DAI may be applicable for one or more multicast G-RNTIs (e.g., all multicast G-RNTIs configured for the UE 120), a remaining bit of the first UL-DAI may be a zero value (e.g., a 0 is inserted into the first UL-DAI), and a remaining two bits of the second UL-DAI may be zero values (e.g., two 0s are inserted into the second UL-DAI), so that the first UL-DAI and the second UL-DAI each have a size of four bits.

As described herein, the UE 120 may be configured to use a dynamic HARQ codebook for multicast (i.e., a type 2 codebook). Here, the UL-DAI indication may be applicable, at least in part, for one or more multicast RNTIs configured for the UE 120. For example, a multiple-bit (e.g., two bit) UL-DAI field may be applicable for a G-RNTI, or a subset of all G-RNTIs, configured for the UE 120. If the UL-DAI indication indicates that the UE is not to multiplex the HARQ feedback on the PUSCH (e.g., a total DAI indicated by the UL-DAI is four $$\left( V_{T-DAI}^{UL} = 4 \right)$$

if the UE 120 did not receive, within a set of monitoring occasions, a physical downlink control channel (PDCCH) with a cyclic redundancy check (CRC) scrambled using the one or more multicast RNTIs (e.g., the UE 120 has not received DCI scheduling downlink multicast data with the G-RNTI or the subset of all G-RNTIs), then the UE 120 may not multiplex the HARQ feedback associated with the one or more multicast RNTIs (e.g., the sub-codebooks corresponding to the one or more multicast RNTIs) on the PUSCH.

As described herein, the HARQ feedback may be ACK/NACK-based feedback or NACK-only-based feedback (e.g., for which the UE 120 indicates NACK feedback but does not provide an indication for ACK feedback). In the case of NACK-only-based feedback (e.g., the PUCCH that overlaps in time with the PUSCH scheduled by the uplink grant is to carry NACK-only-based feedback), then the UE 120 may translate the NACK-only-based feedback to ACK/NACK-based feedback (e.g., the UE 120 may transform the NACK-only-based feedback into ACK/NACK HARQ bits). In this way, the UE 120 may multiplex the NACK-only-based feedback with ACK/NACK-based feedback (e.g., HARQ-ACK feedback) and/or with channel state information on the PUSCH.

In some aspects, the UE 120 may be configured to use different HARQ feedback types for different multicast RNTIs configured for the UE 120. For example, the UE 120 may be configured to use ACK/NACK-based feedback for one or more first multicast RNTIs (e.g., G-RNTIs) configured for the UE 120, and the UE 120 may be configured to use NACK-only-based feedback for one or more second multicast RNTIs (e.g., G-RNTIs) configured for the UE 120. Here, the UL-DAI indication may include multiple UL-DAIs that are grouped separately for the different HARQ feedback types. For example, the UL-DAI indication may include a first UL-DAI applicable for a first group of multicast RNTIs (e.g., one or more G-RNTIs) configured for the UE 120 for use with ACK/NACK-based feedback and a second UL-DAI applicable for a second group of multicast RNTIs (e.g., one or more G-RNTIs) configured for the UE 120 for use with NACK-only-based feedback.

As described herein, the downlink communications for which the UE 120 is to report HARQ feedback may be multicast transmissions that are dynamically scheduled or semi-persistently scheduled for the UE 120. Moreover, the UE 120 may receive a multicast transmission that is dynamically scheduled using a G-RNTI, and the UE 120 may receive a multicast transmission that is semi-persistently scheduled using a G-CS-RNTI. Here, the UL-DAI indication may include multiple UL-DAIs that are grouped separately for dynamically scheduled multicast transmissions and semi-persistently scheduled multicast transmissions. For example, the UL-DAI indication may include a first UL-DAI applicable for a first group of G-RNTIs (e.g., one or more G-RNTIs) configured for the UE 120 and a second UL-DAI applicable for a second group of G-CS-RNTIs (e.g., one or more G-CS-RNTIs) configured for the UE 120.

As shown by reference number 425, the UE 120 may communicate with the network entity 405 in accordance with the UL-DAI indication. For example, as described herein, the UL-DAI indication may indicate whether the UE 120 is to multiplex the HARQ feedback on the PUSCH and/or a size (e.g., a quantity of bits) for the HARQ feedback. Thus, the UE 120 may interpret the UL-DAI indication, as described herein, to determine whether to multiplex HARQ feedback associated with multiple multicast RNTIs, whether to multiplex HARQ feedback associated with unicast and multicast, and/or a size for the HARQ feedback that is to be multiplexed. The UE 120 may generate one or more HARQ codebooks (e.g., for the HARQ feedback) in accordance with the UL-DAI indication and/or the UE 120 may generate the PUSCH transmission in accordance with the UL-DAI indication (e.g., with or without HARQ feedback multiplexed). The UE 120 may transmit, and the network entity 405 may receive, the HARQ feedback multiplexed on the PUSCH transmission (e.g., in accordance with the UL-DAI indication), or the UE 120 may transmit, and the network entity 405 may receive, the PUSCH transmission without the HARQ feedback multiplexed thereon.

In this way, the UL-DAI enables the network entity 405 to efficiently indicate whether the UE 120 is to multiplex HARQ feedback associated with multiple multicast RNTIs, whether the UE 120 is to multiplex HARQ feedback associated with unicast and multicast, and/or a size for the HARQ feedback that is to be multiplexed. Accordingly, the UL-DAI described herein reduces consumption of network resources associated with HARQ feedback reporting, improves a performance of communications to the UE 120, and reduces excessive retransmissions to the UE 120.

As indicated above, FIG. 4 is provided as an example. Other examples may differ from what is described with regard to FIG. 4.

FIG. 5 is a diagram illustrating an example process 500 performed, for example, by a UE, in accordance with the present disclosure. Example process 500 is an example where the UE (e.g., UE 120) performs operations associated with HARQ feedback for multicast.

As shown in FIG. 5, in some aspects, process 500 may include receiving, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback (block 510). For example, the UE (e.g., using communication manager 140 and/or reception component 702, depicted in FIG. 7) may receive, from a network entity, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback, as described above.

As further shown in FIG. 5, in some aspects, process 500 may include communicating, with the network entity, in accordance with the UL-DAI indication (block 520). For example, the UE (e.g., using communication manager 140 and/or transmission component 704, depicted in FIG. 7) may communicate, with the network entity, in accordance with the UL-DAI indication, as described above.

Process 500 may include additional aspects, such as any single aspect or any combination of aspects described below and/or in connection with one or more other processes described elsewhere herein.

In a first aspect, the HARQ feedback is for only multicast and the UE is configured to use a semi-static HARQ codebook for multicast, and the UL-DAI indication includes a single bit that is commonly applicable for one or more multicast radio network temporary identifiers configured for the UE for a cell.

In a second aspect, alone or in combination with the first aspect, the HARQ feedback is for only multicast and the UE is configured to use a dynamic HARQ codebook for multicast, and the UL-DAI indication includes one or more multiple-bit UL-DAIs that are respectively applicable per multicast radio network temporary identifier configured for the UE.

In a third aspect, alone or in combination with one or more of the first and second aspects, the HARQ feedback is for only multicast and the UE is configured to use a dynamic HARQ codebook for multicast, and the UL-DAI indication includes multiple bits that are commonly applicable for one or more multicast RNTIs configured for the UE or a subset of the one or more multicast RNTIs.

In a fourth aspect, alone or in combination with one or more of the first through third aspects, the HARQ feedback is for unicast and for multicast and the UE is configured to use a semi-static HARQ codebook for unicast and for multicast, and the UL-DAI indication includes a single bit that is commonly applicable for unicast and for one or more multicast RNTIs configured for the UE.

In a fifth aspect, alone or in combination with one or more of the first through fourth aspects, the UL-DAI indication includes the single bit that is commonly applicable for unicast and for the one or more multicast RNTIs responsive to a configuration of the UE that results in physical downlink shared channel occasions being commonly counted for unicast and multicast.

In a sixth aspect, alone or in combination with one or more of the first through fifth aspects, the HARQ feedback is for unicast and for multicast and the UE is configured to use a semi-static HARQ codebook for unicast and for multicast, and the UL-DAI indication includes a first single bit that is applicable for unicast and a second single bit that is applicable for one or more multicast radio network temporary identifiers configured for the UE.

In a seventh aspect, alone or in combination with one or more of the first through sixth aspects, the HARQ feedback is for unicast and for multicast and the UE is configured to use a dynamic HARQ codebook for unicast and for multicast, and the UL-DAI indication includes multiple bits that are commonly applicable for unicast and for one multicast RNTI configured for the UE or a group of multicast RNTIs configured for the UE.

In an eighth aspect, alone or in combination with one or more of the first through seventh aspects, the HARQ feedback is for unicast and for multicast and the UE is configured to use a dynamic HARQ codebook for unicast and for multicast, and the UL-DAI indication includes a first multiple-bit UL-DAI that is applicable for unicast and a second multiple-bit UL-DAI that is applicable for one multicast RNTI configured for the UE or a group of multicast RNTIs configured for the UE.

In a ninth aspect, alone or in combination with one or more of the first through eighth aspects, the HARQ feedback is for unicast and for multicast and the UE is configured to use a semi-static HARQ codebook for unicast and a dynamic HARQ codebook for multicast, and the UL-DAI indication includes a first multiple-bit UL-DAI that is applicable for unicast and a second multiple-bit UL-DAI that is applicable for one or more multicast RNTIs configured for the UE or one or more groups of multicast RNTIs configured for the UE.

In a tenth aspect, alone or in combination with one or more of the first through ninth aspects, the first UL-DAI includes a first bit that is applicable for unicast and a second bit that is set to a zero value.

In an eleventh aspect, alone or in combination with one or more of the first through tenth aspects, the HARQ feedback is for unicast and for multicast and the UE is configured to use a dynamic HARQ codebook for unicast and a semi-static HARQ codebook for multicast, and the UL-DAI indication includes a first multiple-bit UL-DAI that is applicable for unicast and a second multiple-bit UL-DAI that is applicable for one or more multicast RNTIs configured for the UE.

In a twelfth aspect, alone or in combination with one or more of the first through eleventh aspects, the second UL-DAI includes a first bit that is applicable for the one or more multicast RNTIs and at least one second bit that is set to a zero value.

In a thirteenth aspect, alone or in combination with one or more of the first through twelfth aspects, the UE is configured to use a dynamic HARQ codebook for multicast, the UL-DAI indication is applicable for one or more multicast RNTIs configured for the UE, and the HARQ feedback associated with the one or more multicast RNTIs is not multiplexed on the PUSCH if the UL-DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

In a fourteenth aspect, alone or in combination with one or more of the first through thirteenth aspects, the UL-DAI indication includes a first UL-DAI applicable for a first group of multicast RNTIs configured for the UE for use with ACK or NACK feedback and a second UL-DAI applicable for a second group of multicast RNTIs configured for the UE for use with NACK only feedback.

In a fifteenth aspect, alone or in combination with one or more of the first through fourteenth aspects, the UL-DAI indication includes a first UL-DAI applicable for a first group of group radio network temporary identifiers configured for the UE and a second UL-DAI applicable for a second group of group configured scheduling radio network temporary identifiers configured for the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
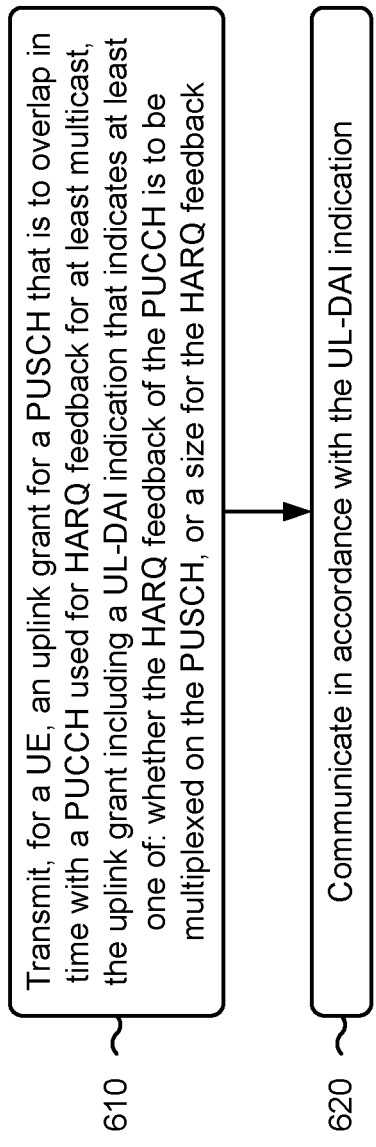

FIG. 6 is a diagram illustrating an example process 600 performed, for example, by a network entity, in accordance with the present disclosure. Example process 600 is an example where the network entity (e.g., a base station 110, a CU 310, a DU 330, an RU 340, or the like) performs operations associated with HARQ feedback for multicast.

As shown in FIG. 6, in some aspects, process 600 may include transmitting, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback (block 610). For example, the network entity (e.g., using communication manager 150 and/or transmission component 804, depicted in FIG. 8) may transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback, as described above.

As further shown in FIG. 6, in some aspects, process 600 may include communicating in accordance with the UL-DAI indication (block 620). For example, the network entity (e.g., using communication manager 150 and/or reception component 802, depicted in FIG. 8) may communicate in accordance with the UL-DAI indication, as described above.

Process 600 may include additional aspects, such as any single aspect or any combination of aspects described below and/or in connection with one or more other processes described elsewhere herein.

In a first aspect, the HARQ feedback is for only multicast and the UE is configured to use a semi-static HARQ codebook for multicast, and the UL-DAI indication includes a single bit that is commonly applicable for one or more multicast radio network temporary identifiers configured for the UE for a cell.

In a second aspect, alone or in combination with the first aspect, the HARQ feedback is for only multicast and the UE is configured to use a dynamic HARQ codebook for multicast, and the UL-DAI indication includes one or more multiple-bit UL-DAIs that are respectively applicable per multicast radio network temporary identifier configured for the UE.

In a third aspect, alone or in combination with one or more of the first and second aspects, the HARQ feedback is for only multicast and the UE is configured to use a dynamic HARQ codebook for multicast, and the UL-DAI indication includes multiple bits that are commonly applicable for one or more multicast RNTIs configured for the UE or a subset of the one or more multicast RNTIs.

In a fourth aspect, alone or in combination with one or more of the first through third aspects, the HARQ feedback is for unicast and for multicast and the UE is configured to use a semi-static HARQ codebook for unicast and for multicast, and the UL-DAI indication includes a single bit that is commonly applicable for unicast and for one or more multicast RNTIs configured for the UE.

In a fifth aspect, alone or in combination with one or more of the first through fourth aspects, the UL-DAI indication includes the single bit that is commonly applicable for unicast and for the one or more multicast RNTIs responsive to a configuration of the UE that results in physical downlink shared channel occasions being commonly counted for unicast and multicast.

In a sixth aspect, alone or in combination with one or more of the first through fifth aspects, the HARQ feedback is for unicast and for multicast and the UE is configured to use a semi-static HARQ codebook for unicast and for multicast, and the UL-DAI indication includes a first single bit that is applicable for unicast and a second single bit that is applicable for one or more multicast radio network temporary identifiers configured for the UE.

In a seventh aspect, alone or in combination with one or more of the first through sixth aspects, the HARQ feedback is for unicast and for multicast and the UE is configured to use a dynamic HARQ codebook for unicast and for multicast, and the UL-DAI indication includes multiple bits that are commonly applicable for unicast and for one multicast RNTI configured for the UE or a group of multicast RNTIs configured for the UE.

In an eighth aspect, alone or in combination with one or more of the first through seventh aspects, the HARQ feedback is for unicast and for multicast and the UE is configured to use a dynamic HARQ codebook for unicast and for multicast, and the UL-DAI indication includes a first multiple-bit UL-DAI that is applicable for unicast and a second multiple-bit UL-DAI that is applicable for one multicast RNTI configured for the UE or a group of multicast RNTIs configured for the UE.

In a ninth aspect, alone or in combination with one or more of the first through eighth aspects, the HARQ feedback is for unicast and for multicast and the UE is configured to use a semi-static HARQ codebook for unicast and a dynamic HARQ codebook for multicast, and the UL-DAI indication includes a first multiple-bit UL-DAI that is applicable for unicast and a second multiple-bit UL-DAI that is applicable for one or more multicast RNTIs configured for the UE or one or more groups of multicast RNTIs configured for the UE.

In a tenth aspect, alone or in combination with one or more of the first through ninth aspects, the first UL-DAI includes a first bit that is applicable for unicast and a second bit that is set to a zero value.

In an eleventh aspect, alone or in combination with one or more of the first through tenth aspects, the HARQ feedback is for unicast and for multicast and the UE is configured to use a dynamic HARQ codebook for unicast and a semi-static HARQ codebook for multicast, and the UL-DAI indication includes a first multiple-bit UL-DAI that is applicable for unicast and a second multiple-bit UL-DAI that is applicable for one or more multicast RNTIs configured for the UE.

In a twelfth aspect, alone or in combination with one or more of the first through eleventh aspects, the second UL-DAI includes a first bit that is applicable for the one or more multicast RNTIs and at least one second bit that is set to a zero value.

In a thirteenth aspect, alone or in combination with one or more of the first through twelfth aspects, the UE is configured to use a dynamic HARQ codebook for multicast, wherein the UL-DAI indication is applicable for one or more multicast RNTIs configured for the UE, and the HARQ feedback associated with the one or more multicast RNTIs is not multiplexed on the PUSCH if the UL-DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

In a fourteenth aspect, alone or in combination with one or more of the first through thirteenth aspects, the UL-DAI indication includes a first UL-DAI applicable for a first group of multicast RNTIs configured for the UE for use with ACK or NACK feedback and a second UL-DAI applicable for a second group of multicast RNTIs configured for the UE for use with NACK only feedback.

In a fifteenth aspect, alone or in combination with one or more of the first through fourteenth aspects, the UL-DAI indication includes a first UL-DAI applicable for a first group of group radio network temporary identifiers configured for the UE and a second UL-DAI applicable for a second group of group configured scheduling radio network temporary identifiers configured for the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
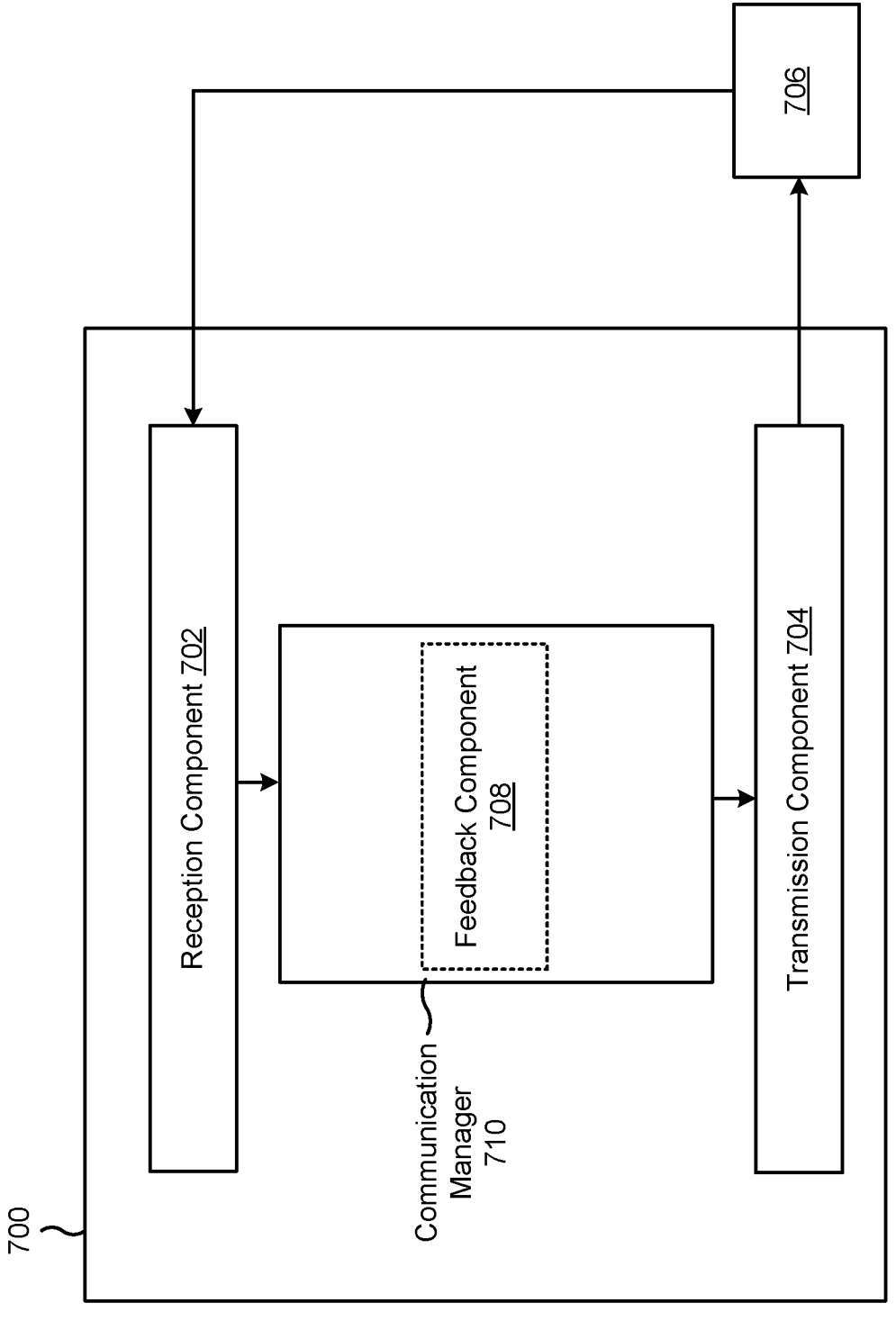
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 710. The communication manager 710 may include a feedback component 708, among other examples. The communication manager 710 may be, or be similar to, the communication manager 140 depicted in FIGS. 1 and 2.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an uplink grant for a PUSCH that is to overlap in time with a PUCCH used for HARQ feedback for at least multicast. In some aspects, the uplink grant may include a UL-DAI indication that indicates at least one of: whether the HARQ feedback of the PUCCH is to be multiplexed on the PUSCH, or a size for the HARQ feedback. The transmission component 704 may communicate, with the network entity, in accordance with the UL-DAI indication. The feedback component 708 may generate the HARQ feedback.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
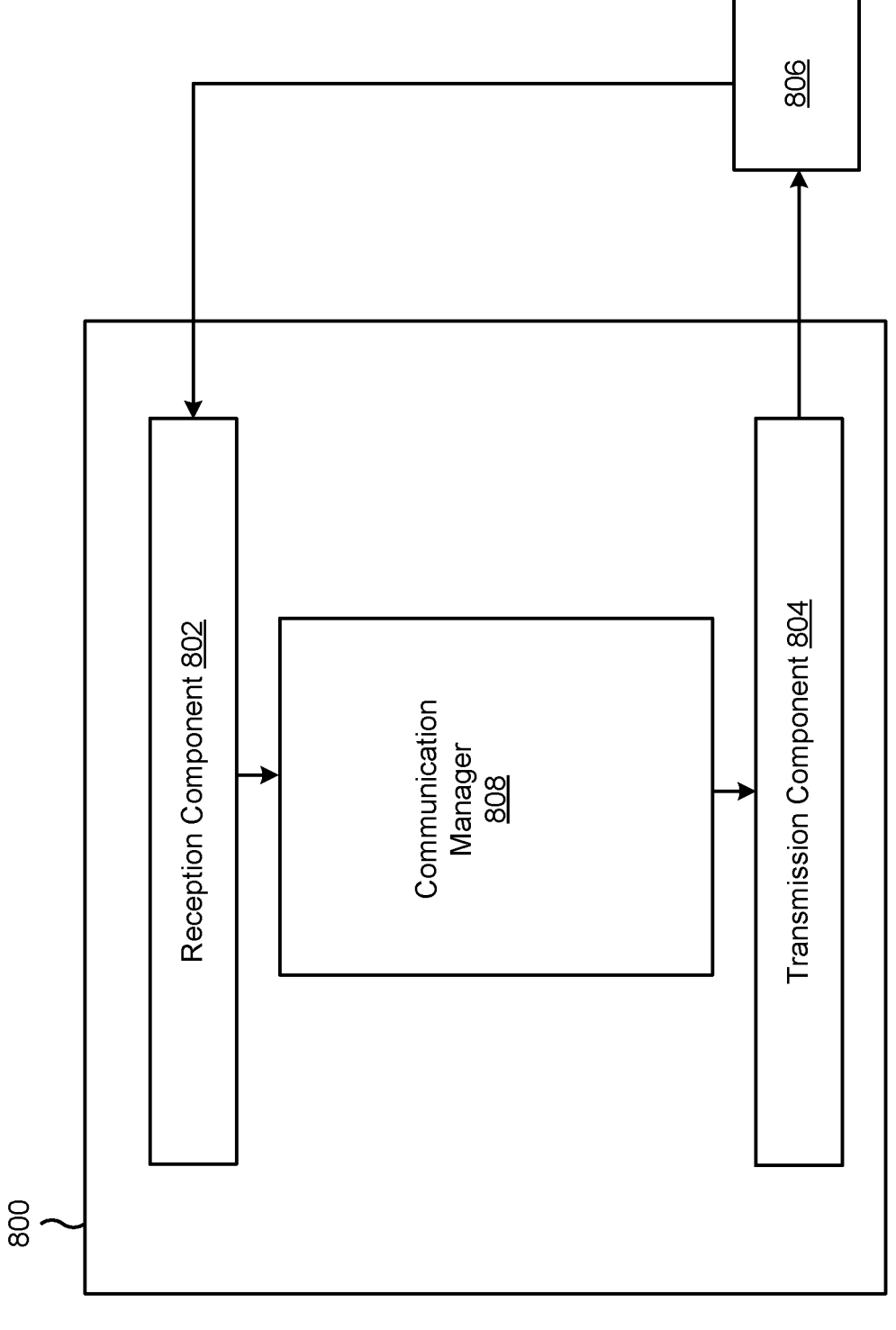

FIG. 8 is a diagram of an example apparatus 800 for wireless communication. The apparatus 800 may be a network entity, or a network entity may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808. The communication manager 808 may be, or be similar to, the communication manager 150 depicted in FIGS. 1 and 2.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the network entity described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network entity described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network entity described in connection with FIG. 2. In some aspects, the transmission component 804 may be co-located with the reception component 802 in a transceiver.

The transmission component 804 may transmit, for a UE, an uplink grant for a PUSCH that is to overlap in time with a PUCCH used for HARQ feedback for at least multicast, the uplink grant including a UL-DAI indication that indicates at least one of: whether the HARQ feedback of the PUCCH is to be multiplexed on the PUSCH, or a size for the HARQ feedback. The reception component 802 may communicate in accordance with the UL-DAI indication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a network entity, an uplink grant for a physical uplink shared channel (PUSCH) that is to overlap in time with a physical uplink control channel (PUCCH) used for hybrid automatic repeat request (HARQ) feedback for at least multicast, the uplink grant including a downlink assignment index (UL-DAI) indication that indicates at least one of: whether the HARQ feedback of the PUCCH is to be multiplexed on the PUSCH, or a size for the HARQ feedback; and communicating, with the network entity, in accordance with the UL-DAI indication.

Aspect 2: The method of Aspect 1, wherein the HARQ feedback is for only multicast and the UE is configured to use a semi-static HARQ codebook for multicast, and wherein the UL-DAI indication includes a single bit that is commonly applicable for one or more multicast radio network temporary identifiers configured for the UE for a cell.

Aspect 3: The method of Aspect 1, wherein the HARQ feedback is for only multicast and the UE is configured to use a dynamic HARQ codebook for multicast, and wherein the UL-DAI indication includes one or more multiple-bit UL-DAIs that are respectively applicable per multicast radio network temporary identifier configured for the UE.

Aspect 4: The method of Aspect 1, wherein the HARQ feedback is for only multicast and the UE is configured to use a dynamic HARQ codebook for multicast, and wherein the UL-DAI indication includes multiple bits that are commonly applicable for one or more multicast radio network temporary identifiers (RNTIs) configured for the UE or a subset of the one or more multicast RNTIs.

Aspect 5: The method of Aspect 1, wherein the HARQ feedback is for unicast and for multicast and the UE is configured to use a semi-static HARQ codebook for unicast and for multicast, and wherein the UL-DAI indication includes a single bit that is commonly applicable for unicast and for one or more multicast radio network temporary identifiers (RNTIs) configured for the UE.

Aspect 6: The method of Aspect 5, wherein the UL-DAI indication includes the single bit that is commonly applicable for unicast and for the one or more multicast RNTIs responsive to a configuration of the UE that results in physical downlink shared channel occasions being commonly counted for unicast and multicast.

Aspect 7: The method of Aspect 1, wherein the HARQ feedback is for unicast and for multicast and the UE is configured to use a semi-static HARQ codebook for unicast and for multicast, and wherein the UL-DAI indication includes a first single bit that is applicable for unicast and a second single bit that is applicable for one or more multicast radio network temporary identifiers configured for the UE.

Aspect 8: The method of Aspect 1, wherein the HARQ feedback is for unicast and for multicast and the UE is configured to use a dynamic HARQ codebook for unicast and for multicast, and wherein the UL-DAI indication includes multiple bits that are commonly applicable for unicast and for one multicast radio network temporary identifier (RNTI) configured for the UE or a group of multicast RNTIs configured for the UE.

Aspect 9: The method of Aspect 1, wherein the HARQ feedback is for unicast and for multicast and the UE is configured to use a dynamic HARQ codebook for unicast and for multicast, and wherein the UL-DAI indication includes a first multiple-bit UL-DAI that is applicable for unicast and a second multiple-bit UL-DAI that is applicable for one multicast radio network temporary identifier (RNTI) configured for the UE or a group of multicast RNTIs configured for the UE.

Aspect 10: The method of Aspect 1, wherein the HARQ feedback is for unicast and for multicast and the UE is configured to use a semi-static HARQ codebook for unicast and a dynamic HARQ codebook for multicast, and wherein the UL-DAI indication includes a first multiple-bit UL-DAI that is applicable for unicast and a second multiple-bit UL-DAI that is applicable for one or more multicast radio network temporary identifier (RNTIs) configured for the UE or one or more groups of multicast RNTIs configured for the UE.

Aspect 11: The method of Aspect 10, wherein the first UL-DAI includes a first bit that is applicable for unicast and a second bit that is set to a zero value.

Aspect 12: The method of Aspect 1, wherein the HARQ feedback is for unicast and for multicast and the UE is configured to use a dynamic HARQ codebook for unicast and a semi-static HARQ codebook for multicast, and wherein the UL-DAI indication includes a first multiple-bit UL-DAI that is applicable for unicast and a second multiple-bit UL-DAI that is applicable for one or more multicast radio network temporary identifiers (RNTIs) configured for the UE.

Aspect 13: The method of Aspect 12, wherein the second UL-DAI includes a first bit that is applicable for the one or more multicast RNTIs and at least one second bit that is set to a zero value.

Aspect 14: The method of any of Aspects 3-4 or 8-11, wherein the UE is configured to use a dynamic HARQ codebook for multicast, wherein the UL-DAI indication is applicable for one or more multicast radio network temporary identifier (RNTIs) configured for the UE, and wherein the HARQ feedback associated with the one or more multicast RNTIs is not multiplexed on the PUSCH if the UL-DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

Aspect 15: The method of any of Aspects 1-14, wherein the UL-DAI indication includes a first UL-DAI applicable for a first group of multicast radio network temporary identifiers (RNTIs) configured for the UE for use with acknowledgment (ACK) or negative acknowledgment (NACK) feedback and a second UL-DAI applicable for a second group of multicast RNTIs configured for the UE for use with NACK only feedback.

Aspect 16: The method of any of Aspects 1-15, wherein the UL-DAI indication includes a first UL-DAI applicable for a first group of group radio network temporary identifiers configured for the UE and a second UL-DAI applicable for a second group of group configured scheduling radio network temporary identifiers configured for the UE.

Aspect 17: A method of wireless communication performed by a network entity, comprising: transmitting, for a user equipment (UE), an uplink grant for a physical uplink shared channel (PUSCH) that is to overlap in time with a physical uplink control channel (PUCCH) used for hybrid automatic repeat request (HARQ) feedback for at least multicast, the uplink grant including a downlink assignment index (UL-DAI) indication that indicates at least one of: whether the HARQ feedback of the PUCCH is to be multiplexed on the PUSCH, or a size for the HARQ feedback; and communicating in accordance with the UL-DAI indication.

Aspect 18: The method of Aspect 17, wherein the HARQ feedback is for only multicast and the UE is configured to use a semi-static HARQ codebook for multicast, and wherein the UL-DAI indication includes a single bit that is commonly applicable for one or more multicast radio network temporary identifiers configured for the UE for a cell.

Aspect 19: The method of Aspect 17, wherein the HARQ feedback is for only multicast and the UE is configured to use a dynamic HARQ codebook for multicast, and wherein the UL-DAI indication includes one or more multiple-bit UL-DAIs that are respectively applicable per multicast radio network temporary identifier configured for the UE.

Aspect 20: The method of Aspect 17, wherein the HARQ feedback is for only multicast and the UE is configured to use a dynamic HARQ codebook for multicast, and wherein the UL-DAI indication includes multiple bits that are commonly applicable for one or more multicast radio network temporary identifiers (RNTIs) configured for the UE or a subset of the one or more multicast RNTIs.

Aspect 21: The method of Aspect 17, wherein the HARQ feedback is for unicast and for multicast and the UE is configured to use a semi-static HARQ codebook for unicast and for multicast, and wherein the UL-DAI indication includes a single bit that is commonly applicable for unicast and for one or more multicast radio network temporary identifiers (RNTIs) configured for the UE.

Aspect 22: The method of Aspect 21, wherein the UL-DAI indication includes the single bit that is commonly applicable for unicast and for the one or more multicast RNTIs responsive to a configuration of the UE that results in physical downlink shared channel occasions being commonly counted for unicast and multicast.

Aspect 23: The method of Aspect 17, wherein the HARQ feedback is for unicast and for multicast and the UE is configured to use a semi-static HARQ codebook for unicast and for multicast, and wherein the UL-DAI indication includes a first single bit that is applicable for unicast and a second single bit that is applicable for one or more multicast radio network temporary identifiers configured for the UE.

Aspect 24: The method of Aspect 17, wherein the HARQ feedback is for unicast and for multicast and the UE is configured to use a dynamic HARQ codebook for unicast and for multicast, and wherein the UL-DAI indication includes multiple bits that are commonly applicable for unicast and for one multicast radio network temporary identifier (RNTI) configured for the UE or a group of multicast RNTIs configured for the UE.

Aspect 25: The method of Aspect 17, wherein the HARQ feedback is for unicast and for multicast and the UE is configured to use a dynamic HARQ codebook for unicast and for multicast, and wherein the UL-DAI indication includes a first multiple-bit UL-DAI that is applicable for unicast and a second multiple-bit UL-DAI that is applicable for one multicast radio network temporary identifier (RNTI) configured for the UE or a group of multicast RNTIs configured for the UE.

Aspect 26: The method of Aspect 17, wherein the HARQ feedback is for unicast and for multicast and the UE is configured to use a semi-static HARQ codebook for unicast and a dynamic HARQ codebook for multicast, and wherein the UL-DAI indication includes a first multiple-bit UL-DAI that is applicable for unicast and a second multiple-bit UL-DAI that is applicable for one or more multicast radio network temporary identifier (RNTIs) configured for the UE or one or more groups of multicast RNTIs configured for the UE.

Aspect 27: The method of Aspect 26, wherein the first UL-DAI includes a first bit that is applicable for unicast and a second bit that is set to a zero value.

Aspect 28: The method of Aspect 17, wherein the HARQ feedback is for unicast and for multicast and the UE is configured to use a dynamic HARQ codebook for unicast and a semi-static HARQ codebook for multicast, and wherein the UL-DAI indication includes a first multiple-bit UL-DAI that is applicable for unicast and a second multiple-bit UL-DAI that is applicable for one or more multicast radio network temporary identifiers (RNTIs) configured for the UE.

Aspect 29: The method of Aspect 28, wherein the second UL-DAI includes a first bit that is applicable for the one or more multicast RNTIs and at least one second bit that is set to a zero value.

Aspect 30: The method of any of Aspects 19-20 or 24-27, wherein the UE is configured to use a dynamic HARQ codebook for multicast, wherein the UL-DAI indication is applicable for one or more multicast radio network temporary identifier (RNTIs) configured for the UE, and wherein the HARQ feedback associated with the one or more multicast RNTIs is not multiplexed on the PUSCH if the UL-DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

Aspect 31: The method of any of Aspects 17-30, wherein the UL-DAI indication includes a first UL-DAI applicable for a first group of multicast radio network temporary identifiers (RNTIs) configured for the UE for use with acknowledgment (ACK) or negative acknowledgment (NACK) feedback and a second UL-DAI applicable for a second group of multicast RNTIs configured for the UE for use with NACK only feedback.

Aspect 32: The method of any of Aspects 17-31, wherein the UL-DAI indication includes a first UL-DAI applicable for a first group of group radio network temporary identifiers configured for the UE and a second UL-DAI applicable for a second group of group configured scheduling radio network temporary identifiers configured for the UE.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-16.

Aspect 35: An apparatus for wireless communication, comprising at least one means for performing the method of one or more of Aspects 1-16.

Aspect 36: A non-transitory computer-readable medium storing code for wireless communication, the code comprising instructions executable by a processor to perform the method of one or more of Aspects 1-16.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: An apparatus for wireless communication at a device, comprising a processor; memory coupled with the processor; and instructions stored in the memory and executable by the processor to cause the apparatus to perform the method of one or more of Aspects 17-32.

Aspect 39: A device for wireless communication, comprising a memory and one or more processors coupled to the memory, the one or more processors configured to perform the method of one or more of Aspects 17-32.

Aspect 40: An apparatus for wireless communication, comprising at least one means for performing the method of one or more of Aspects 17-32.

Aspect 41: A non-transitory computer-readable medium storing code for wireless communication, the code comprising instructions executable by a processor to perform the method of one or more of Aspects 17-32.

Aspect 42: A non-transitory computer-readable medium storing a set of instructions for wireless communication, the set of instructions comprising one or more instructions that, when executed by one or more processors of a device, cause the device to perform the method of one or more of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive, from a network entity, configuration information relating to a downlink assignment index (DAI) indication;

receive, from the network entity, an uplink grant for a physical uplink shared channel (PUSCH) that is to overlap in time with a physical uplink control channel (PUCCH) used for hybrid automatic repeat request (HARQ) feedback for at least multicast, the uplink grant including the DAI indication, wherein the DAI indication includes a plurality of DAIs that are grouped separately for different HARQ feedback types in accordance with the configuration information, and wherein the uplink grant indicates whether the HARQ feedback of the PUCCH is to be multiplexed on the PUSCH; and communicate, with the network entity, in accordance with the DAI indication.

2. The apparatus of claim 1, wherein the HARQ feedback is for only multicast and the UE is configured to use a semi-static HARQ codebook for multicast, and wherein the DAI indication includes a single bit that is commonly applicable for one or more multicast radio network temporary identifiers configured for the UE for a cell.

3. The apparatus of claim 1, wherein the HARQ feedback is for only multicast and the UE is configured to use a dynamic HARQ codebook for multicast, and wherein the DAI indication includes one or more multiple-bit DAIs that are respectively applicable per multicast radio network temporary identifier configured for the UE.

4. The apparatus of claim 1, wherein the HARQ feedback is for only multicast and the UE is configured to use a dynamic HARQ codebook for multicast, and wherein the DAI indication includes multiple bits that are commonly applicable for one or more multicast radio network temporary identifiers (RNTIs) configured for the UE or a subset of the one or more multicast RNTIs.

5. The apparatus of claim 1, wherein the HARQ feedback is for unicast and for multicast and the UE is configured to use a semi-static HARQ codebook for unicast and for multicast, and wherein the DAI indication includes a single bit that is commonly applicable for unicast and for one or more multicast radio network temporary identifiers (RNTIs) configured for the UE.

6. The apparatus of claim 5, wherein the DAI indication includes the single bit that is commonly applicable for unicast and for the one or more multicast RNTIs responsive to a configuration of the UE that results in physical downlink shared channel occasions being commonly counted for unicast and multicast.

7. The apparatus of claim 1, wherein the HARQ feedback is for unicast and for multicast and the UE is configured to use a semi-static HARQ codebook for unicast and for multicast, and wherein the DAI indication includes a first single bit that is applicable for unicast and a second single bit that is applicable for one or more multicast radio network temporary identifiers configured for the UE.

8. The apparatus of claim 1, wherein the HARQ feedback is for unicast and for multicast and the UE is configured to use a dynamic HARQ codebook for unicast and for multicast, and wherein the DAI indication includes multiple bits that are commonly applicable for unicast and for one multicast radio network temporary identifier (RNTI) configured for the UE or a group of multicast RNTIs configured for the UE.

9. The apparatus of claim 1, wherein the HARQ feedback is for unicast and for multicast and the UE is configured to use a dynamic HARQ codebook for unicast and for multicast, and wherein the DAI indication includes a first multiple-bit DAI that is applicable for unicast and a second multiple-bit DAI that is applicable for one multicast radio network temporary identifier (RNTI) configured for the UE or a group of multicast RNTIs configured for the UE.

10. The apparatus of claim 1, wherein the HARQ feedback is for unicast and for multicast and the UE is configured to use a semi-static HARQ codebook for unicast and a dynamic HARQ codebook for multicast, and wherein the DAI indication includes a first DAI that includes a bit that is applicable for unicast and a second multiple-bit DAI that is applicable for one or more multicast radio network temporary identifier (RNTIs) configured for the UE or one or more groups of multicast RNTIs configured for the UE.

11. The apparatus of claim 1, wherein the HARQ feedback is for unicast and for multicast and the UE is configured to use a dynamic HARQ codebook for unicast and a semi-static HARQ codebook for multicast, and wherein the DAI indication includes a first multiple-bit DAI that is applicable for unicast and a second DAI that includes a bit that is applicable for one or more multicast radio network temporary identifiers (RNTIs) configured for the UE.

12. The apparatus of claim 1, wherein the UE is configured to use a dynamic HARQ codebook for multicast, wherein the DAI indication is applicable for one or more multicast radio network temporary identifier (RNTIs) configured for the UE, and wherein the HARQ feedback associated with the one or more multicast RNTIs is not multiplexed on the PUSCH if the DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

13. The apparatus of claim 1, wherein a UE capability of the UE indicates support for multiplexing unicast and multicast HARQ feedback in a PUSCH.

14. An apparatus for wireless communication at a network entity, comprising:

one or more memories; and one or more processors, coupled to the one or more memories, configured to:

transmit, for a user equipment (UE), configuration information relating to a downlink assignment index (DAI) indication;

transmit, for the UE, an uplink grant for a physical uplink shared channel (PUSCH) that is to overlap in time with a physical uplink control channel (PUCCH) used for hybrid automatic repeat request (HARQ) feedback for at least multicast, the uplink grant including the DAI indication, wherein the DAI indication includes a plurality of DAIs that are grouped separately for different HARQ feedback types in accordance with the configuration information, and wherein the uplink grant indicates whether the HARQ feedback of the PUCCH is to be multiplexed on the PUSCH; and communicate in accordance with the DAI indication.

15. The apparatus of claim 14, wherein the HARQ feedback is for only multicast and the UE is configured to use a semi-static HARQ codebook for multicast, and wherein the DAI indication includes a single bit that is commonly applicable for one or more multicast radio network temporary identifiers configured for the UE for a cell.

16. The apparatus of claim 14, wherein the HARQ feedback is for only multicast and the UE is configured to use a dynamic HARQ codebook for multicast, and wherein the DAI indication includes one or more multiple-bit DAIs that are respectively applicable per multicast radio network temporary identifier configured for the UE.

17. The apparatus of claim 14, wherein the HARQ feedback is for only multicast and the UE is configured to use a dynamic HARQ codebook for multicast, and wherein the DAI indication includes multiple bits that are commonly applicable for one or more multicast radio network temporary identifiers (RNTIs) configured for the UE or a subset of the one or more multicast RNTIs.

18. The apparatus of claim 14, wherein the HARQ feedback is for unicast and for multicast and the UE is configured to use a semi-static HARQ codebook for unicast and for multicast, and wherein the DAI indication includes a single bit that is commonly applicable for unicast and for one or more multicast radio network temporary identifiers (RNTIs) configured for the UE.

19. The apparatus of claim 18, wherein the DAI indication includes the single bit that is commonly applicable for unicast and for the one or more multicast RNTIs responsive to a configuration of the UE that results in physical downlink shared channel occasions being commonly counted for unicast and multicast.

20. The apparatus of claim 14, wherein the HARQ feedback is for unicast and for multicast and the UE is configured to use a semi-static HARQ codebook for unicast and for multicast, and wherein the DAI indication includes a first single bit that is applicable for unicast and a second single bit that is applicable for one or more multicast radio network temporary identifiers configured for the UE.

21. The apparatus of claim 14, wherein the HARQ feedback is for unicast and for multicast and the UE is configured to use a dynamic HARQ codebook for unicast and for multicast, and wherein the DAI indication includes multiple bits that are commonly applicable for unicast and for one multicast radio network temporary identifier (RNTI) configured for the UE or a group of multicast RNTIs configured for the UE.

22. The apparatus of claim 14, wherein the HARQ feedback is for unicast and for multicast and the UE is configured to use a dynamic HARQ codebook for unicast and for multicast, and wherein the DAI indication includes a first multiple-bit DAI that is applicable for unicast and a second multiple-bit DAI that is applicable for one multicast radio network temporary identifier (RNTI) configured for the UE or a group of multicast RNTIs configured for the UE.

23. The apparatus of claim 14, wherein the HARQ feedback is for unicast and for multicast and the UE is configured to use a semi-static HARQ codebook for unicast and a dynamic HARQ codebook for multicast, and wherein the DAI indication includes a first DAI that includes a bit that is applicable for unicast and a second multiple-bit DAI that is applicable for one or more multicast radio network temporary identifier (RNTIs) configured for the UE or one or more groups of multicast RNTIs configured for the UE.

24. The apparatus of claim 14, wherein the HARQ feedback is for unicast and for multicast and the UE is configured to use a dynamic HARQ codebook for unicast and a semi-static HARQ codebook for multicast, and wherein the DAI indication includes a first multiple-bit DAI that is applicable for unicast and a second DAI that includes a bit that is applicable for one or more multicast radio network temporary identifiers (RNTIs) configured for the UE.

25. The apparatus of claim 14, wherein the UE is configured to use a dynamic HARQ codebook for multicast, wherein the DAI indication is applicable for one or more multicast radio network temporary identifier (RNTIs) configured for the UE, and wherein the HARQ feedback associated with the one or more multicast RNTIs is not multiplexed on the PUSCH if the DAI indication indicates that the UE is not to multiplex the HARQ feedback on the PUSCH and if the UE did not receive, within a set of monitoring occasions, a physical downlink control channel with a cyclic redundancy check scrambled using the one or more multicast RNTIs.

26. The apparatus of claim 14, wherein a UE capability of the UE indicates support for multiplexing unicast and multicast HARQ feedback in a PUSCH.

27. A method of wireless communication performed by an apparatus of a user equipment (UE), comprising:

receiving, from a network entity, configuration information relating to a downlink assignment index (DAI) indication;

receiving, from the network entity, an uplink grant for a physical uplink shared channel (PUSCH) that is to overlap in time with a physical uplink control channel (PUCCH) used for hybrid automatic repeat request (HARQ) feedback for at least multicast, the uplink grant including the DAI indication, wherein the DAI indication includes a plurality of DAIs that are grouped separately for different HARQ feedback types in accordance with the configuration information, and wherein the uplink grant indicates whether the HARQ feedback of the PUCCH is to be multiplexed on the PUSCH; and communicating, with the network entity, in accordance with the DAI indication.

28. The method of claim 27, wherein the HARQ feedback is for only multicast and the UE is configured to use a dynamic HARQ codebook for multicast, and wherein the DAI indication includes multiple bits that are commonly applicable for one or more multicast radio network temporary identifiers (RNTIs) configured for the UE or a subset of the one or more multicast RNTIs.

29. A method of wireless communication performed by an apparatus of a network entity, comprising:

transmitting, for a user equipment (UE), configuration information relating to a downlink assignment index indication;

transmitting, for the UE, an uplink grant for a physical uplink shared channel (PUSCH) that is to overlap in time with a physical uplink control channel (PUCCH) used for hybrid automatic repeat request (HARQ) feedback for at least multicast, the uplink grant including the DAI indication, wherein the DAI indication includes a plurality of DAIs that are grouped separately for different HARQ feedback types in accordance with the configuration information, and wherein the uplink grant indicates whether the HARQ feedback of the PUCCH is to be multiplexed on the PUSCH; and communicating in accordance with the DAI indication.

30. The method of claim 29, wherein the HARQ feedback is for only multicast and the UE is configured to use a dynamic HARQ codebook for multicast, and wherein the DAI indication includes multiple bits that are commonly applicable for one or more multicast radio network temporary identifiers (RNTIs) configured for the UE or a subset of the one or more multicast RNTIs.

\*   \*   \*   \*   \*